(12) United States Patent
Kusuda

(10) Patent No.: US 12,022,216 B2
(45) Date of Patent: Jun. 25, 2024

(54) OVERLIGHT AMOUNT DETECTION CIRCUIT, LIGHT RECEIVING ELEMENT, AND ELECTRONIC DEVICE

(71) Applicant: Sony Semiconductor Solutions Corporation, Kanagawa (JP)

(72) Inventor: Junichiro Kusuda, Kumamoto (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 126 days.

(21) Appl. No.: 17/771,187

(22) PCT Filed: Oct. 22, 2020

(86) PCT No.: PCT/JP2020/039681
§ 371 (c)(1),
(2) Date: Apr. 22, 2022

(87) PCT Pub. No.: WO2021/085290
PCT Pub. Date: May 6, 2021

(65) Prior Publication Data
US 2022/0360725 A1 Nov. 10, 2022

(30) Foreign Application Priority Data
Oct. 31, 2019 (JP) ................. 2019-199430

(51) Int. Cl.
*H04N 25/62* (2023.01)
*H04N 25/75* (2023.01)
*H04N 25/77* (2023.01)

(52) U.S. Cl.
CPC ............. *H04N 25/62* (2023.01); *H04N 25/75* (2023.01); *H04N 25/77* (2023.01)

(58) Field of Classification Search
CPC ........ H04N 25/62; H04N 25/75; H04N 25/77; H04N 25/627; H04N 25/70; H04N 25/76;
(Continued)

(56) References Cited

U.S. PATENT DOCUMENTS 5,042,070 A * 8/1991 Linna ................ H03G 3/00
381/59
2006/0170796 A1 8/2006 Demonte
(Continued)

FOREIGN PATENT DOCUMENTS

JP 2007-036916 A 2/2007
JP 2008-283557 A 11/2008
(Continued)

OTHER PUBLICATIONS

International Search Report (PCT/ISA/210), International Application No. PCT/JP2020/039681, dated Dec. 15, 2020.

*Primary Examiner* — Jason A Flohre
(74) *Attorney, Agent, or Firm* — Michael Best & Friedrich LLP

(57) ABSTRACT

An overlight amount detection circuit (1) according to the present disclosure includes a MOS transistor and a high-impedance element (Ca). A source of the MOS transistor (Mn1) is connected to a vertical signal line (VSL) of an image sensor. The high-impedance element (Ca) is connected to a drain of the MOS transistor (Mn1). The overlight amount detection circuit (1) detects a potential fluctuation of the vertical signal line (VSL) based on a potential defined by a gate potential of the MOS transistor (Mn1), and outputs a potential of a contact point between the drain of the MOS transistor (Mn1) and the high-impedance element (Ca) as a signal indicating an overlight amount detection result.

15 Claims, 21 Drawing Sheets

(58) Field of Classification Search
CPC ......... H01L 27/14612; H01L 27/14645; H01L 27/14654
See application file for complete search history.

(56) References Cited

U.S. PATENT DOCUMENTS

| | | | |
|---|---|---|---|
| 2007/0023788 A1* | 2/2007 | Yasui | H01L 27/14609 348/E3.019 |
| 2007/0165117 A1* | 7/2007 | Toya | H04N 25/627 348/241 |
| 2015/0237275 A1 | 8/2015 | Iwata | |
| 2016/0195430 A1 | 7/2016 | Sticherling | |
| 2021/0014432 A1* | 1/2021 | Kindt | H04N 5/32 |
| 2021/0014445 A1* | 1/2021 | Ishii | H01L 27/14609 |

FOREIGN PATENT DOCUMENTS

| | | |
|---|---|---|
| JP | 2013-084991 A | 5/2013 |
| JP | 2019-057873 A | 4/2019 |

* cited by examiner

OVERLIGHT AMOUNT DETECTION CIRCUIT, LIGHT RECEIVING ELEMENT, AND ELECTRONIC DEVICE

FIELD

The present disclosure relates to an overlight amount detection circuit, a light receiving element, and an electronic device.

BACKGROUND

When light with extremely high brightness, for example, sunlight, is incident on an image sensor, the image sensor may erroneously determine an originally white a pixel as black, causing an abnormal output called a sunspot in a captured image.

For this reason, there has been an image sensor including a comparison circuit that compares a potential of a vertical signal line reading out a signal charge, which has been subjected to photoelectrical conversion, from each imaging pixel with a predetermined threshold value to detect reception of light in an overlight amount (e.g., Patent Literature 1).

CITATION LIST

Patent Literature

Patent Literature 1: JP 2008-283557 A

SUMMARY

Technical Problem

However, in the image sensor detecting the reception of light in the overlight amount by the comparison circuit, it is required that the comparison circuit be provided for each column of imaging pixels arranged in a matrix form. In addition, comparison accuracy is required for detecting an abnormality. A large-scale comparison circuit is required, resulting in a crease in circuit scale.

At this point, the present disclosure proposes an overlight amount detection circuit, a light receiving element, and an electronic device capable of detecting reception of light in an overlight amount by an image sensor with high accuracy without increasing a circuit scale.

Solution to Problem

An overlight amount detection circuit according to the present disclosure includes a MOS transistor and a high-impedance element. A source of the MOS transistor is connected to a vertical signal line of an image sensor. The high-impedance element is connected to a drain of the MOS transistor. The overlight amount detection circuit detects a potential fluctuation of the vertical signal line based on a potential defined by a gate potential of the MOS transistor, and outputs a potential of a contact point between the drain of the MOS transistor and the high-impedance element as a signal indicating an overlight amount detection result.

DESCRIPTION OF EMBODIMENTS

Hereinafter, embodiments of the present disclosure will be described in detail with reference to the drawings. Note that, in the following embodiments, the same parts will be denoted by the same reference signs, and overlapping description will be omitted.

1. Configuration of Image Sensor

Figure 1:
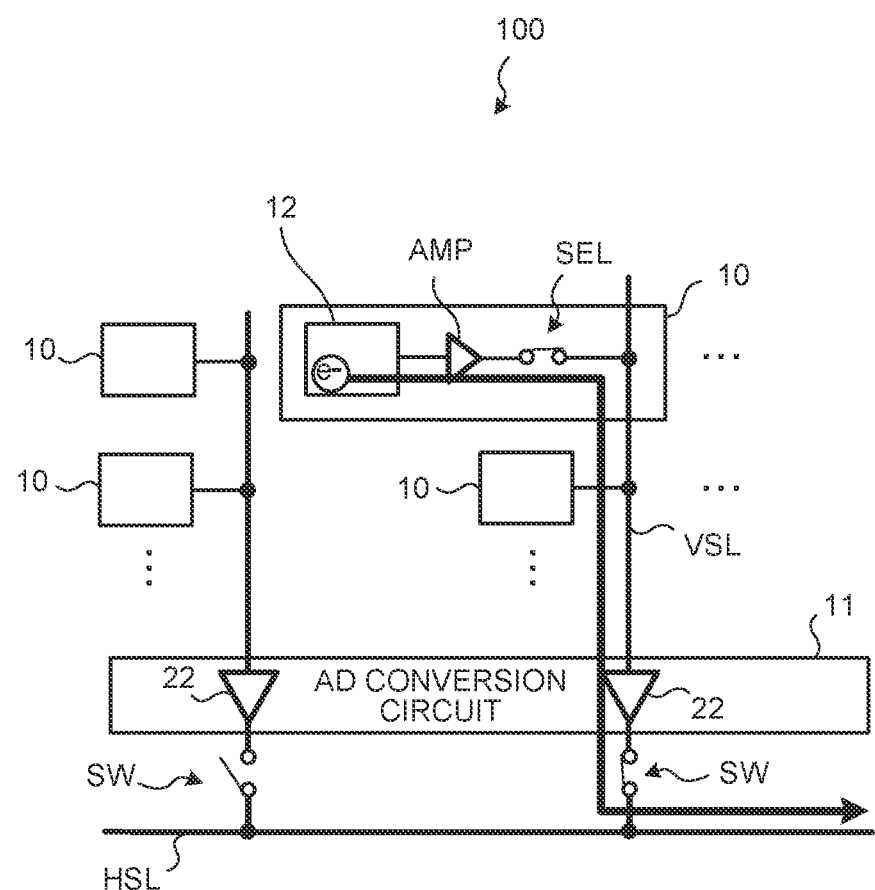
FIG. 1 is an explanatory diagram illustrating an example of a configuration of an image sensor according to the present disclosure.

First, a configuration of an image sensor 100 provided with an overlight amount detection circuit according to the present disclosure will be described with reference to FIG. 1. FIG. 1 is an explanatory diagram illustrating an example of the configuration of the image sensor 100 according to the present disclosure.

The image sensor 100 is a device that forms an image of a subject on an imaging surface, photoelectrically converts light thereof by a photoelectric conversion unit, and outputs a signal charge as a video signal. As illustrated in FIG. 1, the image sensor 100 includes a plurality of pixel units 10 arranged in a matrix form and an AD conversion circuit 11.

Each pixel unit 10 includes an imaging unit 12, an amplification transistor AMP, and a selection transistor SEL. An example of a circuit configuration of the pixel unit 10 will be described later with reference to FIG. 2. The imaging unit 12 is an electron sensor that photoelectrically converts incident light into electrons. The imaging unit 12 outputs a video signal having a voltage amplitude corresponding to a signal charge subjected to photoelectrical conversion to the amplification transistor AMP.

The amplification transistor AMP amplifies the video signal input from the imaging unit 12 and outputs the amplified video signal. The selection transistor SEL has one end connected to the amplification transistor AMP, and the other end connected to a vertical signal line VSL.

A plurality of pixel units 10 having the same configuration are connected to the vertical signal line VSL. The image sensor 100 selects one pixel among the plurality of pixel units 10 by selecting the selection transistor SEL, and propagates the video signal to the AD conversion circuit 11 via the vertical signal line VSL.

The AD conversion circuit 11 includes a comparator 22 for each column. An example of a configuration and an operation of the AD conversion circuit 11 will be described with reference to FIG. 3. The AD conversion circuit 11 outputs the video signal input via the vertical signal line VSL to a horizontal signal line HSL via a switch SW provided for each column after performing correlated double sampling (CDS) and analog-to-digital conversion (ADC).

2. Circuit Configuration and Operation of Pixel Unit

Figure 2:
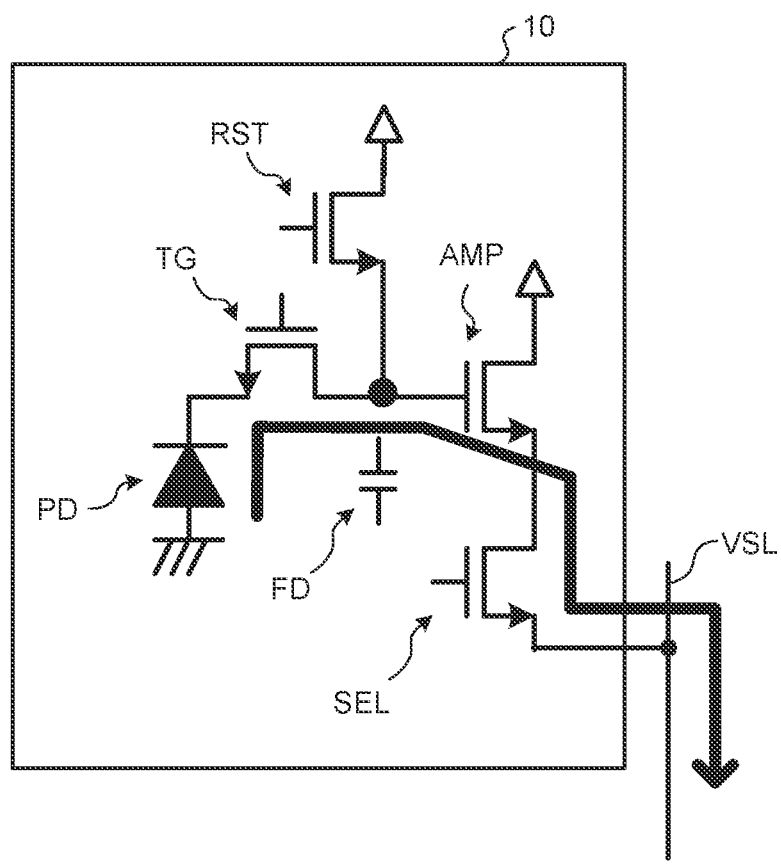
FIG. 2 is an explanatory diagram illustrating an example of a circuit configuration of an imaging unit according to the present disclosure.

Next, a circuit configuration and an operation of the pixel unit 10 will be described with reference to FIG. 2. FIG. 2 is an explanatory diagram illustrating an example of the circuit configuration of the pixel unit 10 according to the present disclosure. As illustrated in FIG. 2, the pixel unit 10 includes a photodiode PD, a transfer transistor TG, a floating diffusion FD, a reset transistor RST, an amplification transistor AMP, and a selection transistor SEL.

The photodiode PD includes an anode connected to the ground and a cathode connected to a source of the transfer transistor TG. A drain of the transfer transistor TG is connected to the floating diffusion FD.

Further, the floating diffusion FD is connected to a source of the reset transistor RST and a gate of the amplification transistor AMP. A drain of the amplification transistor AMP is connected to a power supply. A source of the amplification transistor AMP is connected to a drain of the selection transistor SEL. A source of the selection transistor SEL is connected to the vertical signal line VSL.

When capturing an image, the pixel unit 10 exposes the photodiode PD to light first. The photodiode PD photoelectrically converts incident light into a signal charge corresponding to an amount of the received incident light, and accumulates the signal charge. Then, when the selection transistor SEL is selected, the pixel unit 10 turns on the reset transistor RST to clear the charge held in the floating diffusion FD. This operation is called as reset.

Thereafter, the pixel unit 10 turns off the reset transistor RST, but a certain amount of charge remains in the floating diffusion FD due to the influence of the charge injection of the reset transistor RST, the pumped charge, or the like. Hereinafter, this state will be referred to as phase P.

Next, the transfer transistor TG is turned on to transfer the signal charge accumulated in the photodiode PD to the floating diffusion FD. Hereinafter, this state will be referred to as phase D. A voltage corresponding to the signal charge transferred to the floating diffusion FD is applied to the gate of the amplification transistor AMP.

The amplification transistor AMP converts the signal charge into a voltage amplitude corresponding to an amount of the charge. In each of the reset, P-phase, and D-phase modes described above, the voltage having the voltage amplitude corresponding to the signal charge held in the floating diffusion FD is propagated to the vertical signal line VSL via the selection transistor SEL.

3. Operation of AD Conversion Circuit

Figure 3:
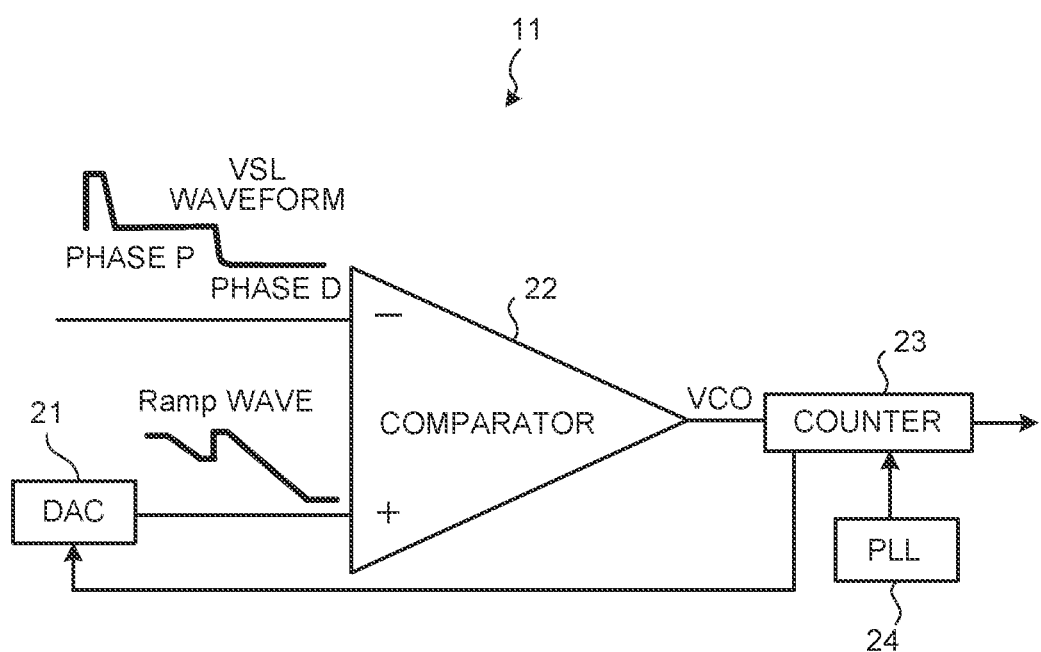
FIG. 3 is a diagram for explaining an operation of an AD conversion circuit according to the present disclosure.

Next, a configuration and an operation of the AD conversion circuit 11 will be described with reference to FIG. 3. FIG. 3 is a diagram for explaining an operation of the AD conversion circuit 11 according to the present disclosure. As illustrated in FIG. 3, the AD conversion circuit 11 includes a digital-to-analog converter (DAC) 21, a comparator 22, a counter 23, and a phase locked loop circuit (PLL) 24.

The DAC 21 generates a Ramp wave and inputs the Ramp wave to a positive terminal of the comparator 22. A P-phase potential is applied to a negative terminal of the comparator 22 from the amplification transistor AMP via the vertical signal line VSL.

The Ramp wave starts a voltage drop from the start of the phase P. The Ramp wave is set to have a higher potential than a waveform of a P-phase potential applied via the vertical signal line VSL (which may hereinafter be referred to as VSL waveform) at a time point when the phase P is started.

That is, for a certain period of time from the start of the phase P, the Ramp wave has a higher potential than the VSL waveform, and an output value VCO of the comparator 22 is High. Thereafter, when the potential of the Ramp wave decreases and becomes lower than that of the VSL waveform, the output value VCO of the comparator 22 transitions to Low. The comparator 22 outputs the output value VCO to the counter 23 connected to the comparator 22.

The PLL 24 generates a reference clock and outputs the reference clock to the counter 23. The counter 23 measures a time from the start of the phase P to the occurrence of the logical inversion. By this operation, the AD conversion circuit 11 converts a voltage amplitude amount of the VSL waveform, which is an analog signal, into time information (count value), which is a digital signal. After the measurement in the phase P, the AD conversion circuit 11 also performs measurement in the phase D in the same manner.

4. Configuration of Comparator

Figure 4:
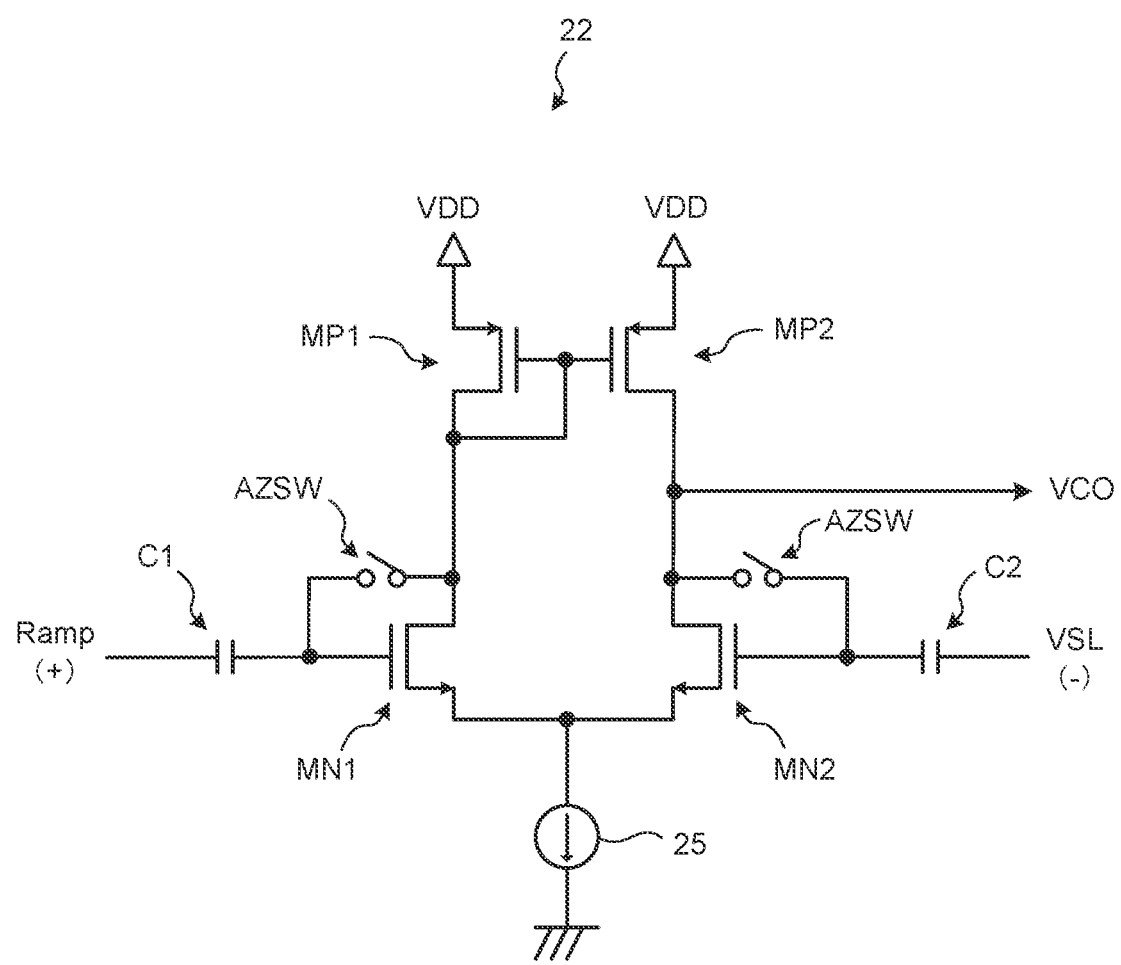
FIG. 4 is an explanatory diagram illustrating an example of a circuit configuration of a comparator according to the present disclosure.

Next, a circuit configuration and an operation of the comparator 22 will be described with reference to FIG. 4. FIG. 4 is an explanatory diagram illustrating an example of the circuit configuration of the comparator 22 according to the present disclosure.

As illustrated in FIG. 4, the comparator 22 is a differential amplifier circuit including a first transistor MN1 and a second transistor MN2 configuring a differential input stage, a third transistor MP1 and a fourth transistor MP2 constituting a current mirror circuit, a current source 25, and an auto zero switch AZSW, a first capacitor C1, and a second capacitor C2.

Here, in order to improve accuracy in comparing the Ramp wave and the VSL waveform, it is preferable that the output value VCO of the comparator 22 is 0 when differential amplifier circuit has no offset voltage, that is, when the potential of the Ramp wave and the potential of the VSL wave are equal to each other.

However, in reality, an offset voltage occurs due to the influence of a relative difference between the first transistor MN1, the second transistor MN2, the third transistor MP1, and the fourth transistor MP2, a DC operating point, or the like.

As illustrated in FIG. 2, the comparator 22 is provided for each vertical signal line VSL, that is, for each column. However, a difference in offset voltage between the vertical signal lines VSL may cause an abnormality such as a vertical streak on the captured image. Thus, it is required to cancel the offset voltage.

So, in the comparator 22, the auto zero switch AZSW is turned on in a state where the reference voltage is applied to the positive terminal to which the Ramp wave is input, the P-phase potential is applied to the negative terminal to which the VSL waveform is input.

By doing so, a voltage that has dropped as much as a gate-source voltage Vgs of the third transistor MP1 is applied to one terminal of the first capacitor C1 on the first transistor MN1 side from a power supply voltage VDD, and the reference voltage is applied to the other terminal of first capacitor C1 from the positive terminal. Then, the first capacitor C1 maintains a potential difference between its opposite terminals.

Further, a negative feedback is applied to a gate of the second transistor MN2 so that a drain current of the second transistor MN2 is equal to a drain current of the fourth transistor MP2.

A gate potential of the second transistor MN2 becomes a potential obtained by superimposing a remaining offset voltage that is not canceled by the negative feedback of the differential amplifier circuit on a gate potential of the first transistor MN1 due to the above-described negative feedback. This potential is applied to one terminal of the second capacitor C2 on the second transistor MN2 side, and the P-phase potential is applied to the other terminal of the second capacitor C2. The second capacitor C2 maintains a potential difference between its opposite terminals.

When the auto zero switch AZSW is turned off in this state, the Ramp wave is applied to the gate of the first transistor MN1 via the first capacitor C1 in an amount that fluctuates from the reference potential. On the other hand, the offset voltage of the differential amplifier circuit is canceled by applying a voltage obtained by subtracting the offset voltage from the P-phase potential to the gate of the second transistor MN2 on the vertical signal line VSL side. The above-described operation of the comparator 22 is an operation called auto zero (AZ).

Further, after performing AZ at the P-phase potential, the comparator 22 compares the D-phase potential. That is, in the comparator 22, a potential for the difference between the phase P and the phase D is applied to the gate of the second transistor MN2 to perform CDS between the P-phase potential and the D-phase potential as well. This series of operations including AZ, AD conversion, and CDS is a function called single slope ADC.

5. Problem

Figure 5:
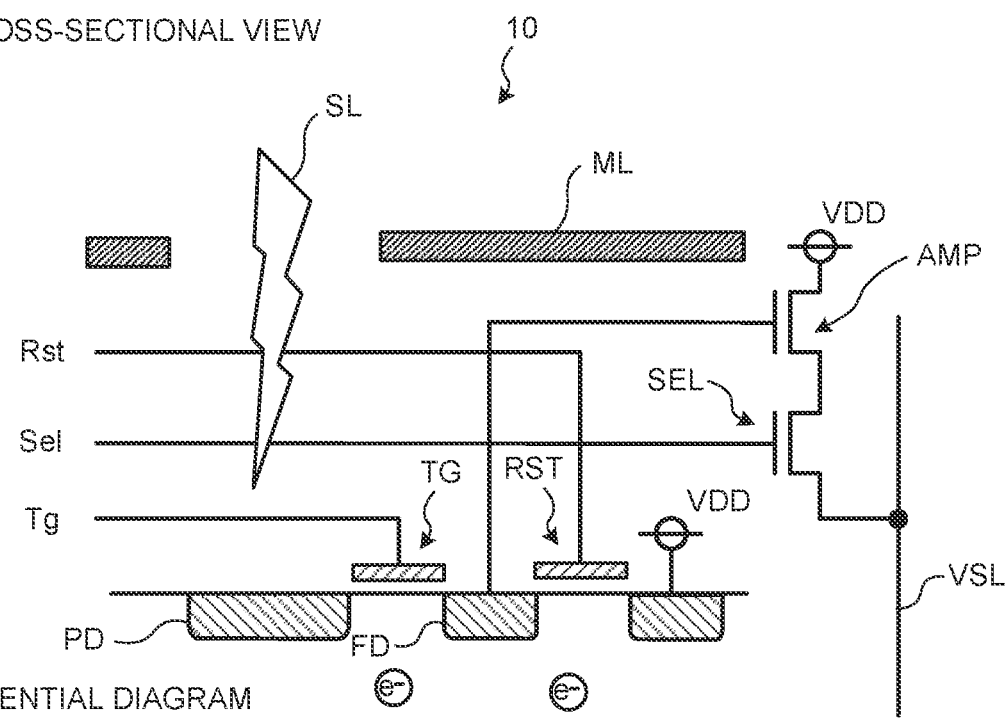
FIG. 5 is a diagram for explaining a state of a pixel unit according to the present disclosure when receiving light in an overlight amount.
Figure 6:
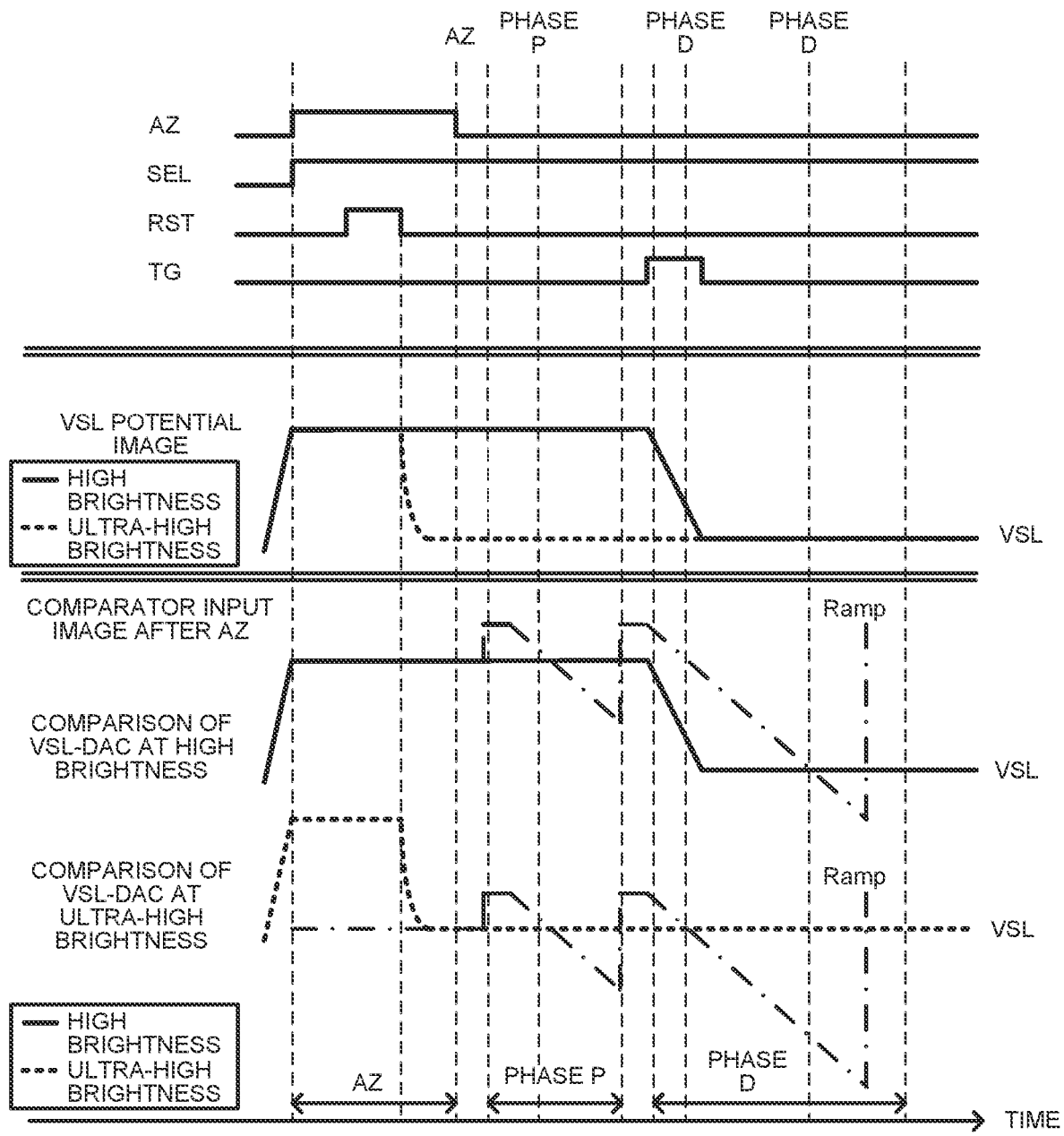
FIG. 6 is a diagram for explaining a problematic VSL waveform related to the present disclosure.

Next, a phenomenon as a problem of the present disclosure will be described with reference to FIGS. 5 and 6. FIG. 5 is a diagram for explaining a state of the pixel unit 10 according to the present disclosure when receiving light in an overlight amount. FIG. 6 is a diagram for explaining a problematic VSL waveform related to the present disclosure.

Note that a cross-sectional view in FIG. 5 illustrates a vertical structure of the pixel unit 10. Further, a potential diagram of FIG. 5 illustrates a state in the pixel unit 10. Here, among the components illustrated in FIG. 5, the same components as those illustrated in FIG. 2 are denoted by the same reference signs as those illustrated in FIG. 2, an overlapping description thereof will be omitted.

Further, a high-level period in a timing chart AZ illustrated in FIG. 6 indicates a period during AZ. A high-level period in a timing chart SEL indicates a period during which the selection transistor SEL is turned on.

A high-level period in a timing chart RST indicates a period during which the reset transistor RST is turned on. A high-level period in a timing chart TG indicates a period during which the transfer transistor TG is turned on.

VSL illustrated by a thick solid line indicates a VSL waveform at a high brightness in a non-overlight amount state. VSL illustrated by a dotted line indicates a VSL waveform when the photodiode PD is irradiated with ultra high-brightness light and a charge is generated in an amount of more than Qs, which is a maximum amount of charge that can be accumulated in the photodiode PD. Ramp indicated by an alternate long and short dash line indicates a Ramp wave.

The problem related to the present disclosure arises during the AZ period in the overlight amount state. As described above, the P-phase potential is applied to the comparator 22 on its VSL side during the AZ period to cancel the offset voltage of the comparator 22. However, when ultra high-brightness light such as sunlight is incident on the photodiode PD, the P-phase potential may change.

Specifically, as illustrated in FIG. 5, in the pixel unit 10, light SL is incident on the photodiode PD through an opening provided in a metal light-shielding film ML. Here, Qs illustrated in FIG. 5 indicates a maximum amount of charge that can be accumulated in the photodiode PD. Qfd indicates a maximum amount of charge that can be accumulated in the floating diffusion FD.

The lower diagram of FIG. 5 illustrates a potential in the phase P after an RST operation is completed. The floating diffusion FD holds a charge $e^-$ generated by the charge injection of the reset transistor RST or the like.

In this state, if the photodiode PD is strongly irradiated with light and the charge $e^-$ generated by photoelectric conversion exceeds Qs, the charge $e^-$ leaks to the floating diffusion FD beyond a barrier of the transfer transistor TG.

The charge e⁻ exceeding Qfd is recombined with holes and is dissipated after reaching the power supply voltage VDD line beyond the reset transistor RST. That is, the amount of charge e⁻ held in the floating diffusion FD continues to increase until the charge e⁻ is used up to Qfd.

A potential fluctuation of the vertical signal line VSL when this change occurs is illustrated in FIG. 6. When light is irradiated in an amount not to exceed Qs, there is no fluctuate in P-phase potential as illustrated by the thick solid line, which means that AZ is normally performed at that potential.

Thereafter, when the transfer transistor TG is turned on to transition to the phase D, the signal charge is transferred to the floating diffusion FD, and the potential of the vertical signal line VSL decreases. However, an amount of this change is applied to the gate of the second transistor MN2 beyond the second capacitor C2 illustrated in FIG. 4, which means that CDS is normally performed.

In contrast, when light is incident in an amount exceeding Qs, as illustrated by the dotted line for the VSL potential image, a charge e⁻ exceeding Qs reaches the floating diffusion FD immediately after the reset of the floating diffusion FD is completed, and the potential of the vertical signal line VSL drops to a potential determined as Qfd.

Thus, even though the transfer transistor TG is turned on and the signal charge is read out, the charge e⁻ more than or equal to Qfd is not held in the floating diffusion FD, and no potential fluctuation of the vertical signal line VSL also occurs. That is, in spite of transition to the phase D, no potential difference occurs between the phase P and the phase D. However, in the comparator 22, AZ is performed at the P-phase potential that has dropped to a potential determined as Qfd.

Since there is no potential difference between the phase P and the phase D as described above, a time from the start of the drop in the phase P of the Ramp waveform until the logical inversion to the VSL waveform is the same as that from the start of the drop in the phase D of the Ramp waveform until the logical inversion to the VSL waveform. That is, it is determined that the brightness of the incident light before exposure is the same that after exposure. As a result, a white pixel is erroneously determined as black due to sunlight. This phenomenon is called sunspot.

6. Sunspot Countermeasure Circuit According to Comparative Example

Figure 7:
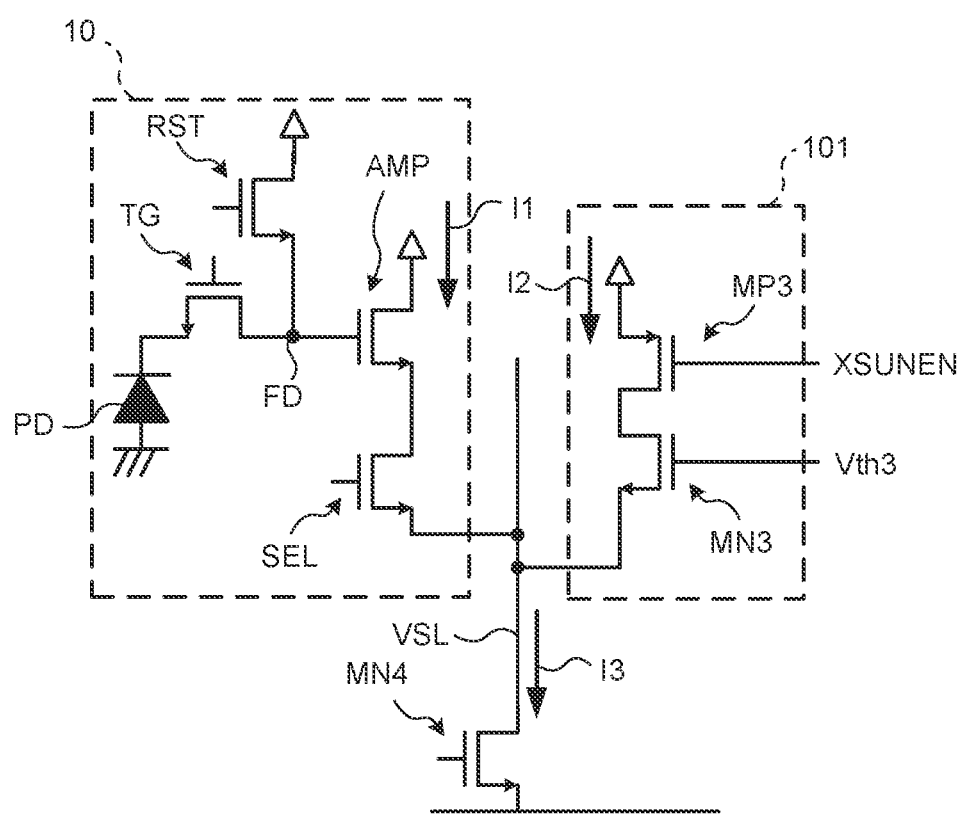
FIG. 7 is a diagram illustrating an example of a sunspot countermeasure circuit according to a comparative example of the present disclosure.
Figure 8:
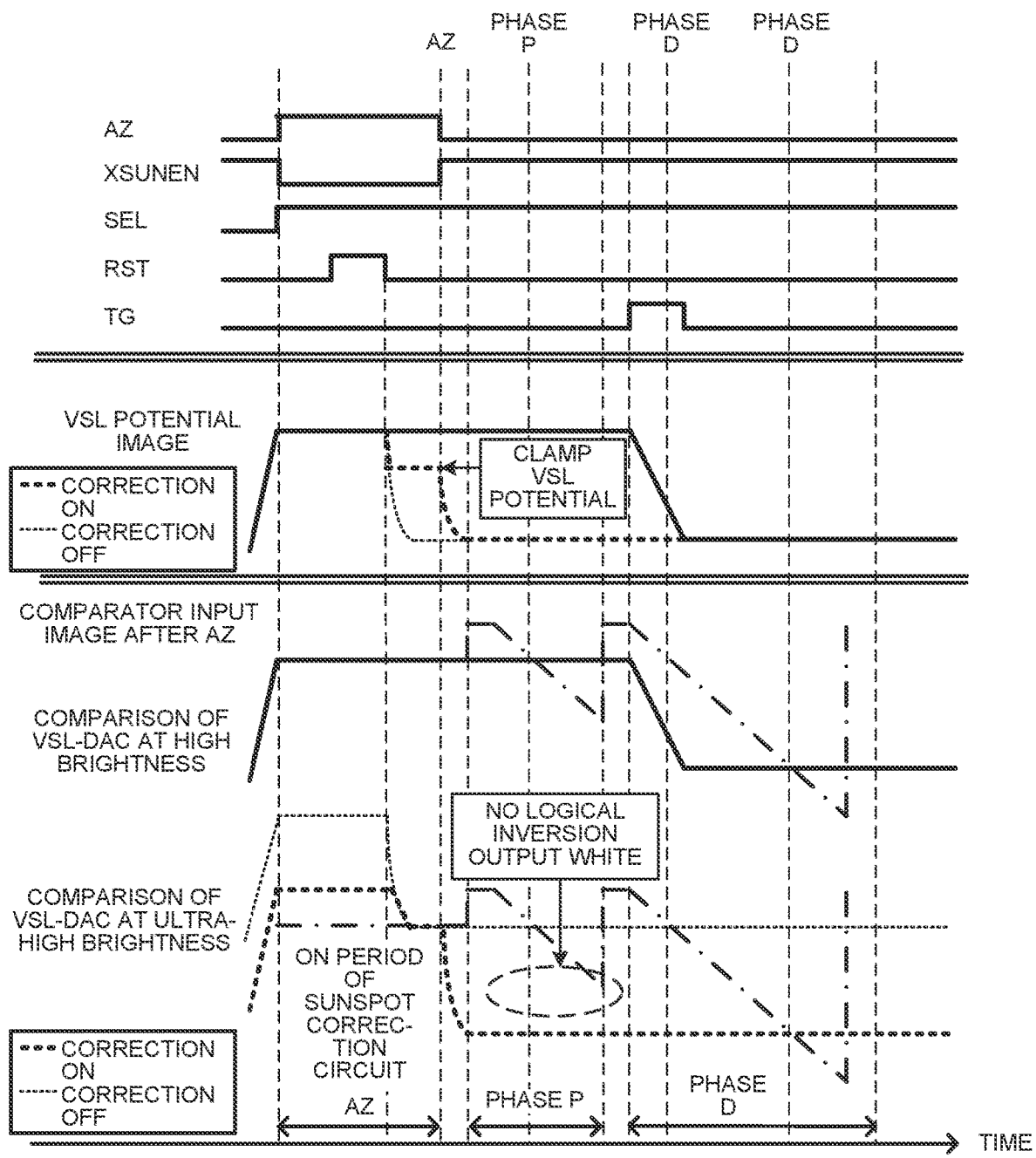
FIG. 8 is an explanatory diagram illustrating an operation timing and an output waveform of the sunspot countermeasure circuit according to the comparative example of the present disclosure.

Next, a sunspot countermeasure circuit according to a comparative example of the present disclosure for suppressing an occurrence of a sunspot will be described with reference to FIGS. 7 and 8. FIG. 7 is a diagram illustrating an example of a sunspot countermeasure circuit according to a comparative example of the present disclosure. FIG. 8 is an explanatory diagram illustrating an operation timing and an output waveform of the sunspot countermeasure circuit according to the comparative example of the present disclosure.

Note that, among the components illustrated in FIG. 7, the same components as those illustrated in FIG. 2 are denoted by the same reference signs as those illustrated in FIG. 2, an overlapping description thereof will be omitted. As illustrated in FIG. 7, the sunspot countermeasure circuit according to the comparative example includes a clamp circuit 101 provided for each pixel unit 10.

The clamp circuit 101 includes a P-channel metal oxide semiconductor (MOS) transistor (hereinafter referred to as "PMOS transistor") MP3 and an N-channel MOS transistor (hereinafter referred to as "NMOS transistor") MN3.

In the PMOS transistor MP3, a source is connected to a power supply, a drain is connected to a drain of the NMOS transistor MN3, and a predetermined gate voltage XSUNEN is applied to a gate. In the NMOS transistor MN3, a source is connected to the vertical signal line VSL, and a predetermined threshold voltage Vth3 is applied to a gate.

The clamp circuit 101 turns on the PMOS transistor MP3 during the AZ period by setting the gate voltage XSUNEN to Low. As light is received in an overlight amount, a charge reaches the floating diffusion FD, and a potential of the vertical signal line VSL drops.

Then, in a state where the potential of the vertical signal line VSL does not drop to a clamp level defined by the predetermined threshold voltage Vth3, the NMOS transistor MN3 is turned off. Thereafter, when the potential of the vertical signal line VSL drops to a potential defined by the predetermined threshold voltage Vth3, the NMOS transistor MN3 is turned on start its operation.

Then, when the potential of the vertical signal line VSL drops to a potential at which a gate potential of the NMOS transistor MN3 becomes sufficiently higher than that of the amplification transistor AMP, the amplification transistor AMP is turned off.

Even if the charge of the floating diffusion FD increases further, the potential of the vertical signal line VSL does not drop. By this operation, the clamp circuit 101 clamps the potential of the vertical signal line VSL to the potential defined by the predetermined threshold voltage Vth3.

Figure 9:
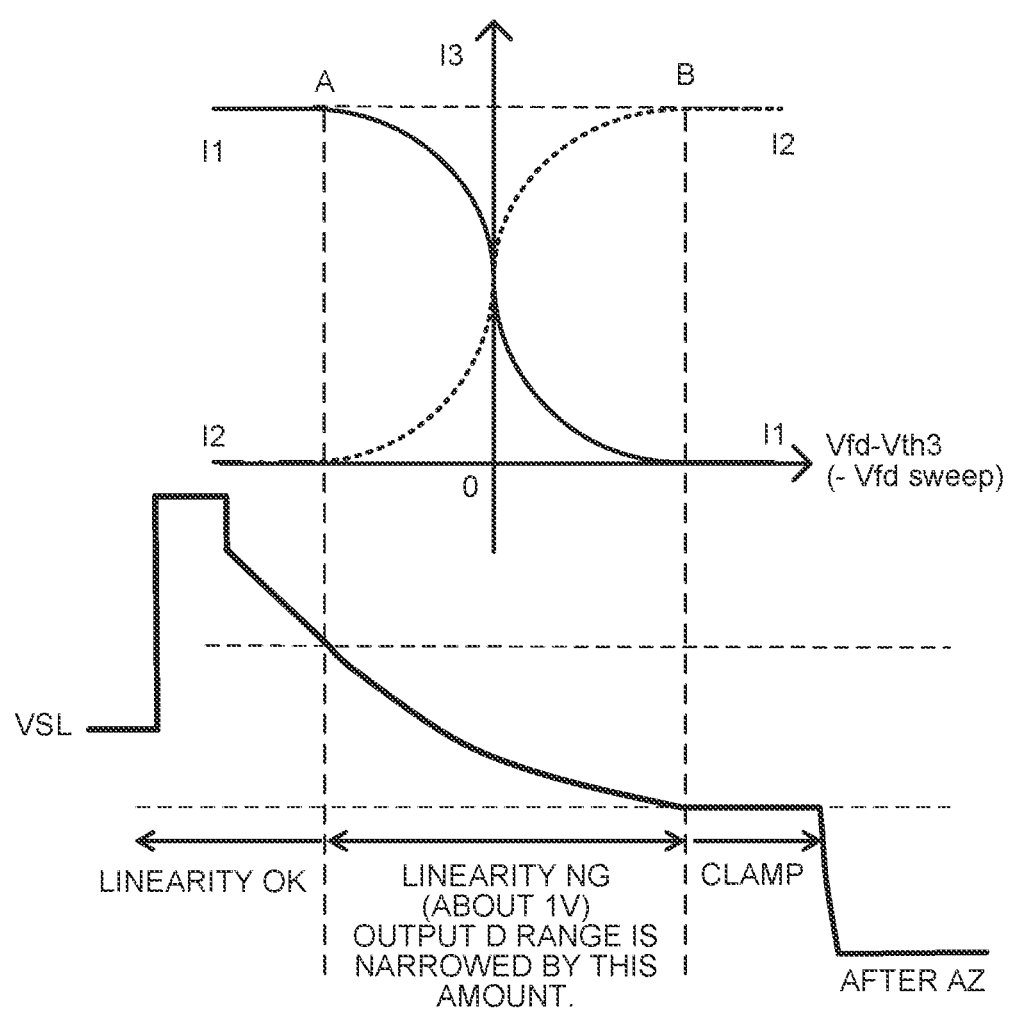
FIG. 9 is an explanatory diagram illustrating changes in current and VSL waveform when a clamp circuit is operated according to the comparative example of the present disclosure.

After the AZ is completed, the clamp circuit 101 turns off the NMOS transistor MN3 by setting the gate voltage XSUNEN to High and turning off the PMOS transistor MP3. Accordingly, the amplification transistor AMP is turned on to drop the voltage so that the potential of the vertical signal line VSL becomes back to a potential corresponding to an amount of charge in the floating diffusion FD, as illustrated in FIG. 9.

The potential fluctuation after the AZ is transmitted as the potential fluctuation of the gate of the second transistor MN2 beyond the second capacitor C2 illustrated in FIG. 4. The predetermined threshold voltage Vth3 illustrated in FIG. 7 is set so that the gate potential of the second transistor MN2 is sufficiently lower than the gate potential of the first transistor MN1, and the logical inversion of the output value VCO of the comparator 22 does not occur.

The counter 23 illustrated in FIG. 3 determines that a pixel has a sunspot and converts its video signal to white when no logical inversion occurs during counting in the phase P, that is, when counting up to the upper limit of the count value. In this way, the clamp circuit 101 can suppress an occurrence of a sunspot.

However, the clamp circuit 101 has the problems to be described below. The first problem is that the NMOS transistor MN3 starts to operate at a timing when a difference between a gate voltage of the amplification transistor AMP, that is, a potential of the floating diffusion FD (hereinafter referred to as "Vfd"), and the threshold voltage Vth3, which is the gate voltage of the NMOS transistor MN3, becomes small.

Here, a current flowing through the circuit illustrated in FIG. 7 when the clamp circuit 101 is operated will be described with reference to FIG. 9. FIG. 9 is an explanatory diagram illustrating changes in current and VSL waveform when the clamp circuit 101 is operated according to the comparative example of the present disclosure.

FIG. 9 illustrates relationships of the above-described potential difference (Vfd–Vth3) with a current I1 flowing out of the amplification transistor AMP, a current I2 flowing out of the NMOS transistor MN3, and a potential fluctuation of the vertical signal line VSL illustrated in FIG. 7.

Specifically, in the upper diagram of FIG. 9, a change in current I1 and a change in current I2 accompanied by a change in potential difference (Vfd–Vth3) are indicated by a solid line and a dotted line, respectively. The lower diagram of FIG. 9 illustrates a potential fluctuation of the vertical signal line VSL accompanied by a change in potential difference (Vfd–Vth3).

Here, a potential of the vertical signal line VSL is represented by the following Equation (1). Further, a gate-source voltage Vgs (AMP) of the amplification transistor AMP in the equation (1) is represented by the following Equation (2). Further, the currents I1, I2, and I3 illustrated in FIG. 7 satisfies a relationship represented by the following Equation (3).

$$VSL = Vfd - Vgs(AMP) \quad (1)$$

$$Vgs(AMP) = \sqrt{\frac{2 \times I_1}{\frac{W}{L} \times \mu n \times Cox}} + Vth \quad (2)$$

$$I3 = I1 + I2 \quad (3)$$

In the above equations, the current I1 is a drain current of the amplification transistor AMP, W/L is an aspect ratio of the amplification transistor AMP, μn is a carrier mobility, Cox is a gate capacitance per unit area, and Vth is a threshold voltage of the amplification transistor AMP.

The amplification transistor AMP and the NMOS transistor MN3 illustrated in FIG. 7 constitute a differential circuit, and a splitting ratio of the current I3 varies depending on a potential difference between the respective gates thereof. Thus, when the potential difference between the respective gates thereof is small, the NMOS transistor MN3 allows the current I2 to flow, and the current I1 decreases accordingly (see Equation (3)). Then, as the current I1 decreases, the gate-source voltage Vgs (AMP) also decreases (see Equation (2)).

The amplification transistor AMP and the NMOS transistor MN4, through which the current I3 flows, form a source follower configuration. Thus, in a situation where the current I1 does not fluctuate, that is, when the gate-source voltage Vgs (AMP) does not fluctuate, a source potential fluctuates depending on a fluctuation in potential Vfd of the floating diffusion FD, and its linearity is maintained.

However, if the current I1 fluctuates, the gate-source voltage Vgs (AMP) also changes according to an amount of the fluctuation, causing a factor other than the fluctuation in potential Vfd of the floating diffusion FD to be involved, and thus, the linearity is broken (see Equations (1) and (2)).

Thus, a potential that can be used as a source follower is a potential Vfd of the floating diffusion FD only in the range of higher than that at point A illustrated in FIG. 9. A potential of the vertical signal line VSL to be clamped is a potential at point B illustrated in FIG. 9, to which the potential of the vertical signal line VSL further drops such that the amplification transistor AMP is turned off. That is, the drop from the point A illustrated in FIG. 9 of the potential of the vertical signal line VSL to be clamped stops merely at the point B, and an output D (dynamic) range of the vertical signal line VSL is narrowed by that potential (problem 1).

As a countermeasure for solving the problem 1, for example, the voltage drop of the vertical signal line VSL may be detected using a comparison circuit equivalent to the comparator 22. However, in order to reduce the dead zone (the range from the point A to the point B illustrated in FIG. 9) concerning the problem 1, an accuracy equivalent to that of the comparator 22 is required, resulting in a large-scale circuit. Moreover, it is necessary that the circuit for detecting a voltage drop of the vertical signal line VSL be provided for each column, resulting in a problem that the circuit scale further increases (problem 2).

As a way of clamping the potential of the vertical signal line VSL by a configuration other than the clamp circuit 101 illustrated in FIG. 7, the potential of the vertical signal line VSL may be clamped to the gate-source voltage Vgs of the PMOS transistor by connecting the gate of the PMOS transistor to the vertical signal line VSL and connecting the source of the PMOS transistor to the power supply.

However, in this configuration, a clamp level can be adjusted only by a gate-source voltage Vgs of the PMOS transistor. In this case, the clamp level can be adjusted only by an aspect ratio of a size of the PMOS transistor MP3, and thus, the adjustment is difficult (problem 3).

Further, although a case where the pixel unit 10 is an electron sensor has been described as an example of FIG. 7, a problem also occurs when the pixel unit 10 is a hall sensor. Specifically, the clamp circuit 101 illustrated in FIG. 7 is a circuit in which, in a case where the pixel unit 10 is an electron sensor, the clamp operation is performed when the threshold voltage Vth3 is exceeded with respect to the drop of the potential Vfd of the floating diffusion FD.

In contrast, in a case where the pixel unit 10 is a hall sensor, the potential Vfd of the floating diffusion FD increases when the overlight amount is reached. Thus, the clamp circuit 101 cannot clamp the potential of the vertical signal line VSL by virtue of the NMOS transistor MN3.

Figure 10:
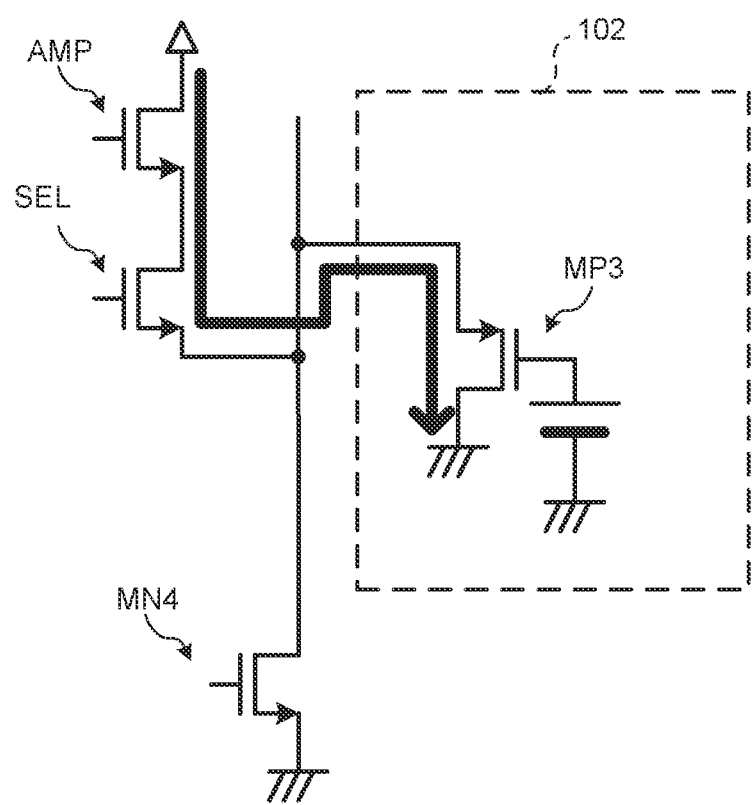
FIG. 10 is a diagram illustrating another example of a sunspot countermeasure circuit according to a comparative example of the present disclosure.

Further, for example, as in a detection circuit 102 illustrated in FIG. 10, it is easily assumed that the NMOS transistor MN3 is replaced with the PMOS transistor MP3. However, in this configuration, the amplification transistor AMP and the PMOS transistor MP3 are short-circuited due to a low impedance, and a large current flows between the power supply and the ground as indicated by a thick-line arrow in FIG. 10. Therefore, the clamp circuit 101 according to the comparative example of the present disclosure cannot be used for a hall sensor (problem 4).

7. Overlight Amount Detection Circuit According to Present Disclosure

Therefore, an overlight amount detection circuit according to the present disclosure, which has been made to solve the above-described problems 1 to 4, is capable of detecting reception of light in an overlight amount by an image sensor with high accuracy without increasing a circuit scale and narrowing an output D range. Next, an overlight amount detection circuit according to the present disclosure will be described with reference to FIG. 11.

Figure 11:
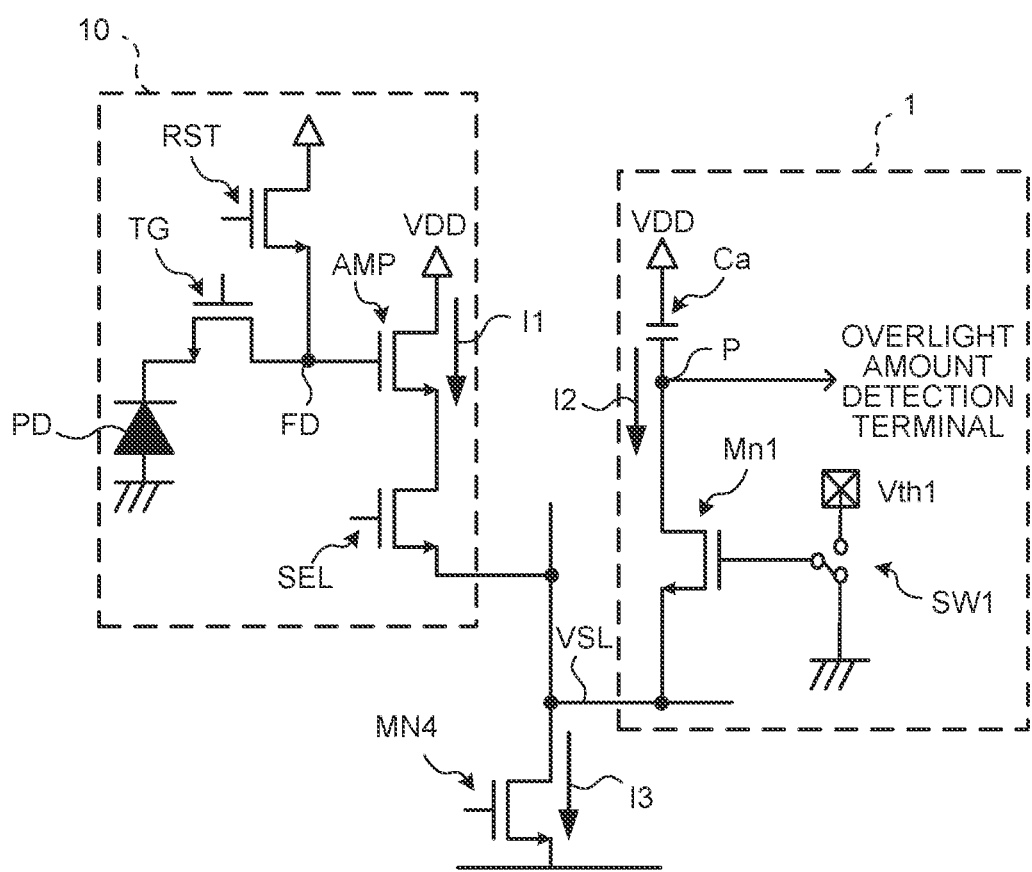
FIG. 11 is a diagram illustrating an example of an overlight amount detection circuit according to the present disclosure.

FIG. 11 is a diagram illustrating an example of an overlight amount detection circuit 1 according to the present disclosure. Note that, among the components illustrated in FIG. 11, the same components as those illustrated in FIG. 7 are denoted by the same reference signs as those illustrated in FIG. 7, an overlapping description thereof will be omitted.

As illustrated in FIG. 11, the overlight amount detection circuit 1 is configured by an NMOS transistor Mn1 and a capacitor Ca, and detects a fluctuation in P-phase potential when light is received in an overlight amount, which is represented by sunlight. The capacitor Ca may be replaced with a resistor as long as the resistor is a high-impedance element.

In the NMOS transistor Mn1, a source is connected to the vertical signal line VSL of the image sensor, and a drain is connected to one terminal of the capacitor Ca. The other terminal of the capacitor Ca is connected to the power supply voltage VDD line. Further, a predetermined threshold voltage Vth1 is applied to a gate of the NMOS transistor Mn1 via a switch SW1.

Here, an operation of the overlight amount detection circuit 1 will be described. Here, the operation when the reset of the floating diffusion FD is completed, the P-phase potential is held in the floating diffusion FD, and the AZ period is reached will be described. In this case, in the overlight amount detection circuit 1, it is assumed that the capacitor Ca is discharged in advance by a circuit that is not illustrated, and a potential at point P holds the power supply voltage VDD.

When light is incident in an overlight amount on the photodiode PD of the pixel unit 10, and a signal charge, into which the light is photoelectrically converted, exceeds Qs and reaches the floating diffusion FD, the potential of the floating diffusion FD drops. Accordingly, the potential of the vertical signal line VSL also drops.

When the potential of the vertical signal line VSL is higher than or equal to a threshold level (hereinafter referred to as threshold voltage Vth1) defined by the gate potential of the NMOS transistor Mn1, the NMOS transistor Mn1 is in a turn-off state, and thus, the capacitor Ca holds the power supply voltage VDD. Thereafter, when the potential of the vertical signal line VSL is lower than the threshold voltage Vth1, the NMOS transistor Mn1 is turned on to supply a current to the capacitor Ca.

The potential of the capacitor Ca linearly drops proportionally to a time constant of Q=CV=IT, but when it drops to a potential at which the potential difference between the drain and the source of the NMOS transistor Mn1 disappears, the NMOS transistor Mn1 enters a triode operation and the current decreases, and finally, the current becomes zero.

In this way, when the pixel unit 10 receives light in an overlight amount and the potential of the vertical signal line VSL drops to the potential defined according to the threshold voltage Vth1, the overlight amount detection circuit 1 can clamp the potential of the vertical signal line VSL to the potential at that time.

At this time, when the pixel unit 10 receives light in an overlight amount, the potential at the connection point P connecting the capacitor Ca and the NMOS transistor Mn1 to each other transitions from High to Low.

Thus, the overlight amount detection circuit 1 transmits the potential at the connection point P from an overlight amount detection terminal to a subsequent-stage circuit as an overlight amount detection result, thereby conveying that the P-phase potential has fluctuated due to the overlight amount, such that a video signal of a relevant pixel is converted to white, while ignoring a subsequent operation.

After the AZ period, the overlight amount detection circuit 1 connects the gate potential of the NMOS transistor Mn1 to the ground through the switch SW1 to complete the detection and return to the normal operation. In this way, since the NMOS transistor Mn1 is turned off during the period in which the P-phase or D-phase potential is propagated through the vertical signal line VSL, the overlight amount detection circuit 1 has no influence on signal transmission even in the normal operation in which no fluctuation in P-phase potential occurs.

Note that although it has been described herein that the overlight amount detection circuit 1 is connected to the pixel unit 10 to detect reception of light in an overlight amount through the pixel unit 10, a pixel circuit to which the overlight amount detection circuit 1 is connected is not limited to the pixel unit 10. When connected to, for example, an image sensor having a global shutter function in a memory holding type, the overlight amount detection circuit 1 can detect reception of light in an overlight amount by the image sensor.

8. Discussion of Problems

Figure 12:
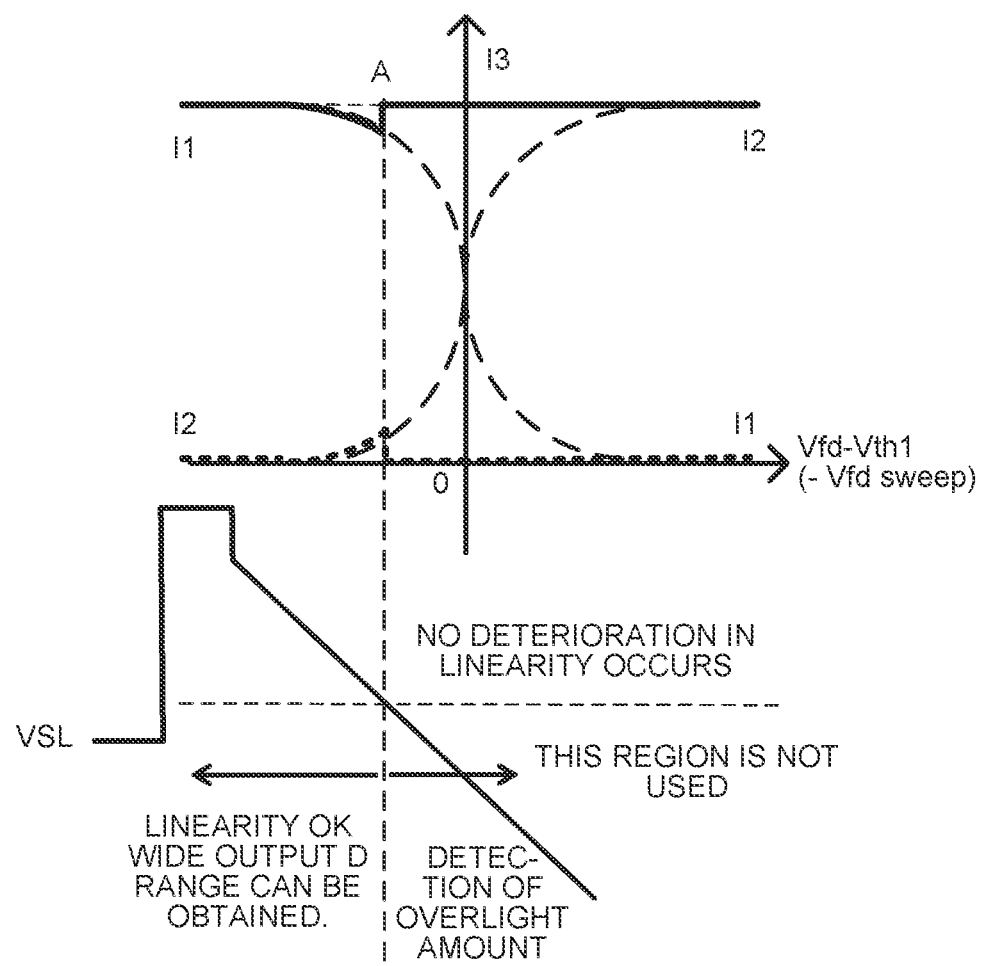
FIG. 12 is an explanatory diagram illustrating changes in current and VSL waveform when the overlight amount detection circuit according to the present disclosure is operated.
Figure 13:
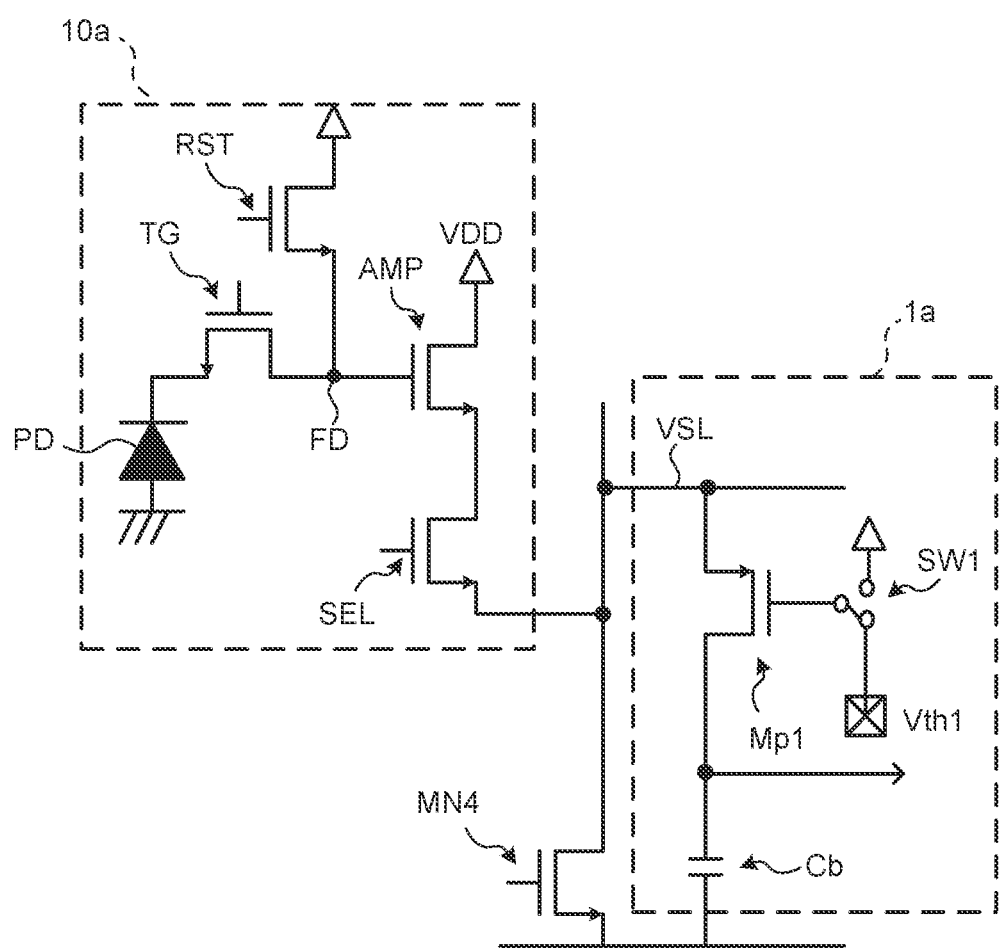
FIG. 13 is a diagram illustrating an example of an overlight amount detection circuit for detecting reception of light in an overlight amount by a hall sensor according to the present disclosure.

Next, the above-described problems 1 to 4 will be discussed with reference to FIGS. 12 and 13. FIG. 12 is an explanatory diagram illustrating changes in current and VSL waveform when the overlight amount detection circuit 1 according to the present disclosure is operated. FIG. 13 is a diagram illustrating an example of an overlight amount detection circuit 1a for detecting reception of light in an overlight amount by a hall sensor according to the present disclosure.

FIG. 12 illustrates relationships of a potential difference (Vfd−Vth1) with a current I1 flowing out of the amplification transistor AMP, a current I2 flowing out of the NMOS transistor Mn1, and a potential fluctuation of the vertical signal line VSL illustrated in FIG. 11.

Specifically, in the upper diagram of FIG. 12, a change in current I1 and a change in current I2 accompanied by a change in potential difference (Vfd−Vth1) are indicated by a solid line and a dotted line, respectively. The lower diagram of FIG. 12 illustrates a potential fluctuation of the vertical signal line VSL accompanied by a change in potential difference (Vfd−Vth1).

Regarding the problem 1, as illustrated in FIG. 12, since the logical inversion is performed using only a current at a moment when the NMOS transistor Mn1 starts to operate and then the current is turned off, the linearity in the inversion does not deteriorate. The threshold level can be set to a maximum value of an output D range, and a wide output D range can be secured.

Next, regarding the problem 2, the overlight amount detection circuit 1, which can be configured by the NMOS transistor Mn1 and the capacitor Ca, has almost no dead band with almost the same number of circuit elements as the clamp circuit 101 illustrated in FIG. 7, and thus, is capable of detection with high accuracy in a wide range. Next, regarding the problem 3, the threshold level for clamping the potential of the vertical signal line VSL can be freely adjusted by setting the gate potential of the NMOS transistor Mn1.

Next, regarding the problem 4, when the photoelectric conversion element is a hall sensor, the detection element may be a PMOS transistor Mp1 as illustrated in FIG. 13. Specifically, when the photoelectric conversion element is a hall sensor, the overlight amount detection circuit 1a is configured by a PMOS transistor Mp1 and a capacitor Cb. The capacitor Cb may be replaced with a resistor as long as the resistor is a high-impedance element.

In the PMOS transistor Mp1, a source is connected to the vertical signal line VSL of the image sensor, and a drain is connected to one terminal of the capacitor Cb. The other terminal of the capacitor Cb is connected to a source of the NMOS transistor MN4. Further, a predetermined threshold voltage Vth1 is applied to a gate of the PMOS transistor Mp1 via a switch SW1. In this way, when the photoelectric conversion element is a hall sensor, the overlight amount detection circuit 1a is capable of detection the overlight amount with high accuracy in a wide output D range, like the overlight amount detection circuit 1 illustrated in FIG. 11.

Further, the overlight amount detection circuit 1 or 1a detects reception of light in an overlight amount based on the potential fluctuation itself of the vertical signal line VSL. Thus, the overlight amount detection circuit 1 or 1a can output a signal corresponding to a binary value indicating whether or not light has been received in an overlight amount to a subsequent-stage circuit as an overlight amount detection result.

Here, the overlight amount detection circuit 1 or 1a outputs the signal indicating the overlight amount detection result to the counter 23. The counter 23 stops counting when the signal indicating the reception of light in the overlight amount is input thereto from the overlight amount detection circuit 1 or 1a. Accordingly, the image sensor 100 can prevent an occurrence of a sunspot by forcibly whitening a pixel in which the reception of light in the overlight amount is detected.

Further, the overlight amount detection circuit 1 or 1a outputs the signal indicating the overlight amount detection result to the comparator 22 connected to the overlight amount detection circuit 1 or 1a. The comparator 22 stops comparing the potential of the vertical signal line VSL with the Ramp wave when the signal indicating the reception of light in the overlight amount is input thereto from the overlight amount detection circuit 1 or 1a. Accordingly, the image sensor 100 can prevent an occurrence of a sunspot by forcibly whitening a pixel in which the reception of light in the overlight amount is detected.

In addition, when detecting the reception of light in the overlight amount, the overlight amount detection circuit 1 or 1a outputs a dummy potential signal, instead of the potential of the vertical signal line VSL, to the positive terminal of the comparator 22, the dummy potential signal corresponding to a case where light is received at a high brightness while not causing a charge $e^-$ generated by photoelectric conversion to exceed Qs. Thus, the image sensor 100 can prevent an occurrence of a sunspot.

9. Application Example of Overlight Amount Detection Circuit

Figure 14:
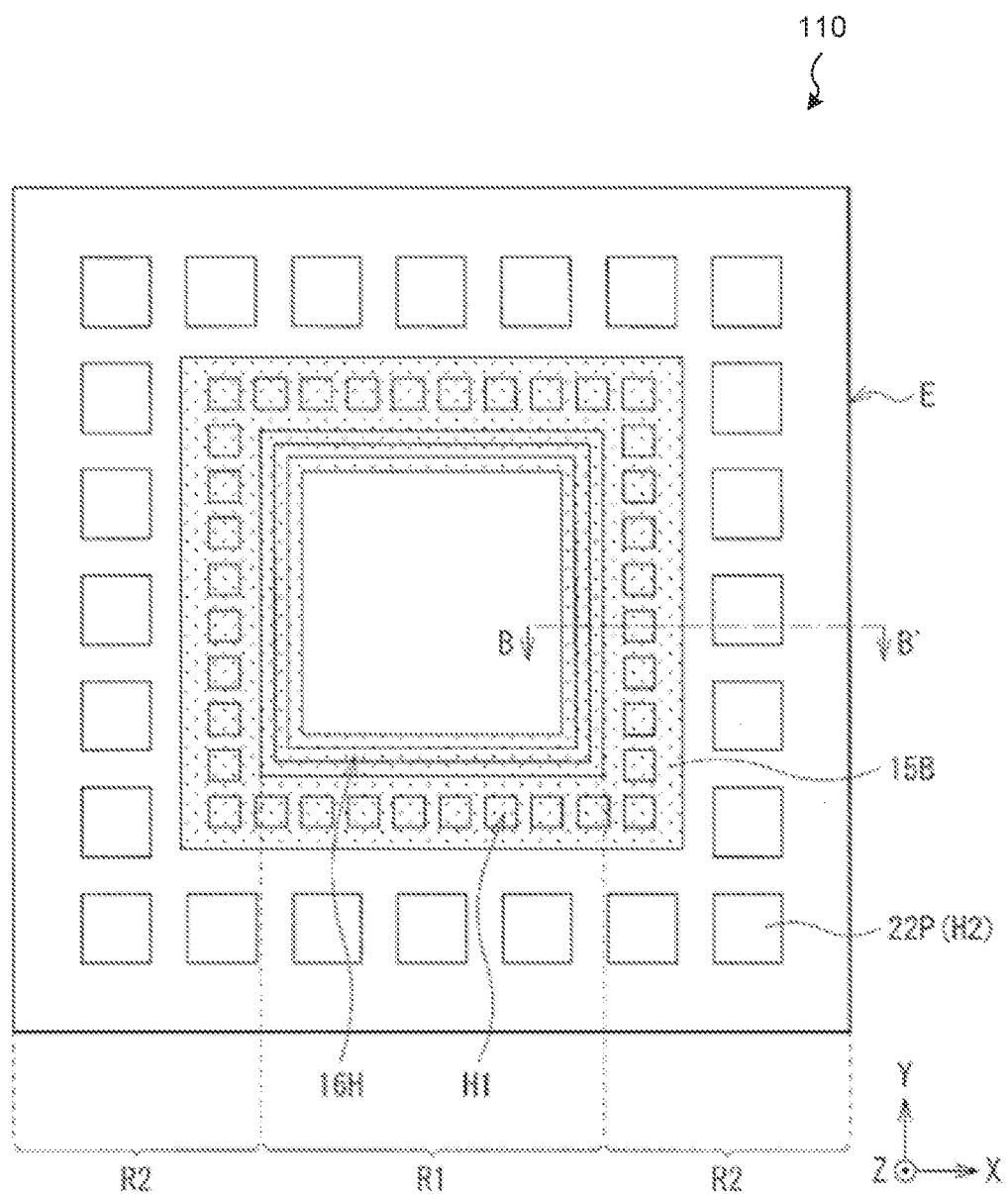
FIG. 14 is a schematic plan view illustrating a schematic configuration of a light receiving element to which the overlight amount detection circuit according to the present disclosure is applied.
Figure 15:
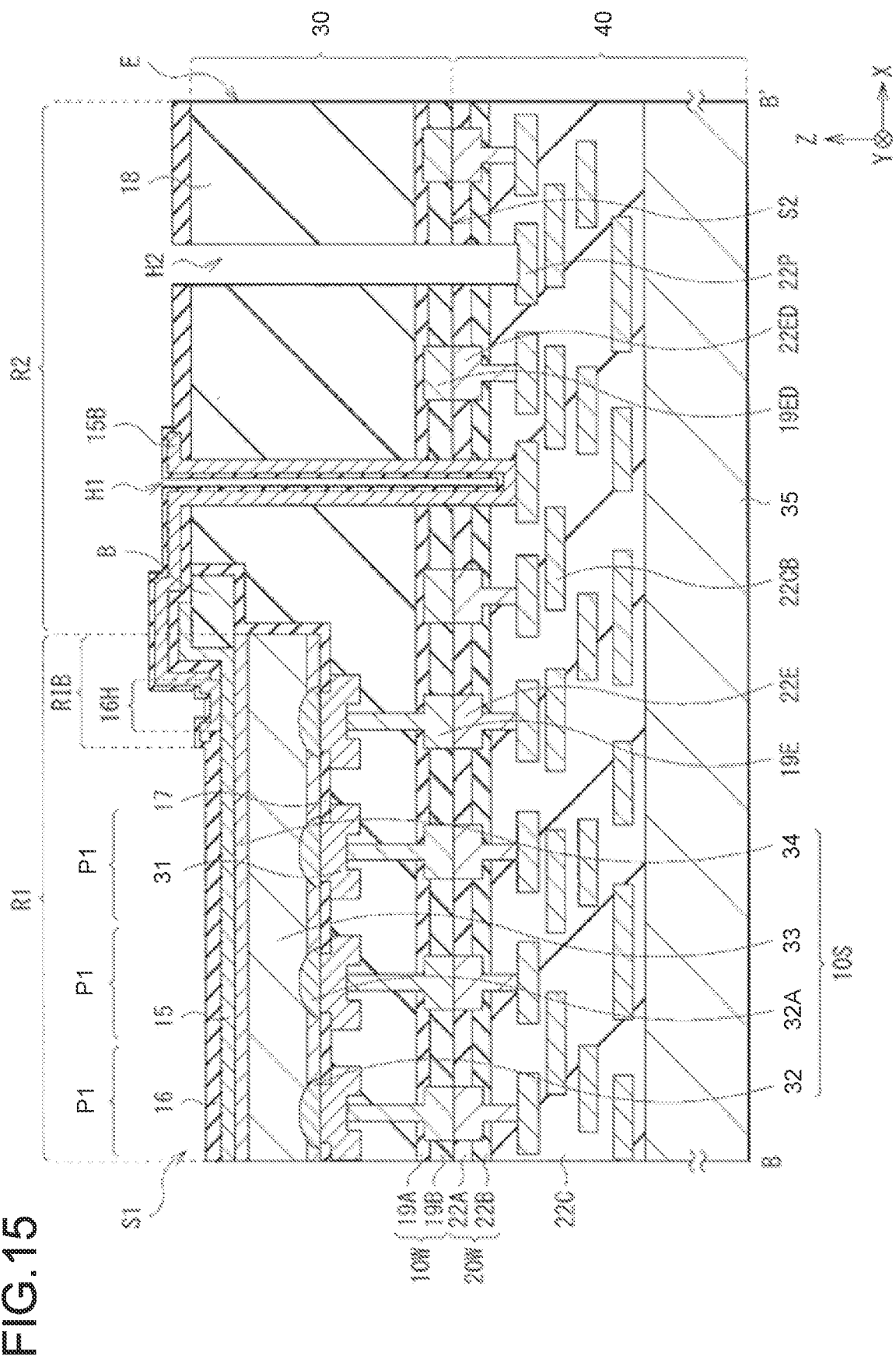
FIG. 15 is a schematic view illustrating a cross-sectional configuration taken along line B-B' of FIG. 14.

Next, a light receiving element to which the overlight amount detection circuit according to the present disclosure is applied will be described with reference to FIGS. 14 and 15. FIGS. 14 and 15 illustrate a schematic configuration of a light receiving element 110 to which the overlight amount detection circuit 1 or 1a according to the present disclosure is applied. FIG. 14 illustrates a planar configuration of the light receiving element 110, and FIG. 15 illustrates a cross-sectional configuration taken along line B-B' of FIG. 14.

The light receiving element 110 is applied to, for example, an infrared sensor or the like using a compound semiconductor material such as a Group III-V semiconductor, and has a photoelectric conversion function for light having a wavelength, for example, from a visible region (e.g., 380 nm or more and less than 780 nm) to a short infrared region (e.g., 780 nm or more and less than 2400 nm). The light receiving element 110 includes a plurality of light receiving unit regions P1 (pixels P1) arranged, for example, in a two-dimensional manner (FIG. 15).

The light receiving element 110 has an element region R1 provided in a central portion thereof and a peripheral region R2 provided outside the element region R1 to surround the element region R1 (FIG. 14). The light receiving element 110 includes a conductive film 15B provided from the element region R1 to the peripheral region R2. The conductive film 15B has an opening in a region facing a central portion of the element region R1.

The light receiving element 110 has a stack structure including an element substrate 30 and a readout circuit board 40, which is an example of a circuit board (FIG. 15). One surface of the element substrate 30 is a light incident surface (light incident surface S1), and a surface (the other surface) opposite to the light incident surface S1 of the element substrate 30 is a joint surface (joint surface S2) joined to the readout circuit board 40.

The element substrate 30 includes a wiring layer 10W, a first electrode 31, a semiconductor layer 10S (first semiconductor layer), a second electrode 15, and a passivation film 16 in this order from a position close to the readout circuit board 40. A surface facing the wiring layer 10W and an end surface (side surface) of the semiconductor layer 10S are covered with an insulating film 17. The readout circuit board 40 is a so-called readout integrate circuit (ROIC), and includes a wiring layer 20W contacting the joint surface S2 of the element substrate 30, a multilayer wiring layer 22C, and a semiconductor substrate 35 facing the element substrate 30 with the wiring layer 20W and the multilayer wiring layer 22C interposed therebetween.

The element substrate 30 has the semiconductor layer 10S provided in the element region R1. In other words, a region where the semiconductor layer 10S is provided is the element region R1 of the light receiving element 110. In the element region R1, a region exposed from the conductive film 15B (a region facing the opening of the conductive film 15B) is a light receiving region. In the element region R1, a region covered with the conductive film 15B is an optical black (OPB) region R1B. The OPB region R1B is provided to surround the light receiving region. The OPB region R1B is used to obtain a black-level pixel signal. The element substrate 30 includes an embedded layer 18 together with the insulating film 17 in the peripheral region R2. In the peripheral region R2, holes H1 and H2 penetrating through the element substrate 30 and reaching the readout circuit board 40 are provided. In the light receiving element 110, light is incident on the semiconductor layer 10S from the light incident surface S1 of the element substrate 30 through the passivation film 16, the second electrode 15, and a second contact layer 14. A signal charge generated by photoelectrical conversion in the semiconductor layer 10S moves, through the first electrode 31 and the wiring layer 10W, to the readout circuit board 40 in which the signal charge is read out. Hereinafter, a configuration of each part will be described.

The wiring layer 10W is provided over the element region R1 and the peripheral region R2, and has a joint surface S2 joined to the readout circuit board 40. In the light receiving element 110, the joint surface S2 of the element substrate 30 is provided in the element region R1 and the peripheral region R2. For example, the joint surface S2 of the element region R1 and the joint surface S2 of the peripheral region R2 form the same plane. As will be described later, in the light receiving element 110, the joint surface S2 of the peripheral region R2 is formed by providing the embedded layer 18.

The wiring layer 10W has a contact electrode 19E and a dummy electrode 19ED in, for example, interlayer insulating films 19A and 19B. For example, the interlayer insulating film 19B is disposed on the readout circuit board 40 side, and the interlayer insulating film 19A is disposed on a first contact layer 32 side, and these interlayer insulating films 19A and 19B are stacked. The interlayer insulating films 19A and 19B are formed of, for example, an inorganic insulating material. Examples of the inorganic insulating material include silicon nitride (SiN), aluminum oxide ($Al_2O$), silicon oxide ($SiO_2$), hafnium oxide ($HfO_2$), and the like. The interlayer insulating films 19A and 19B may be formed of the same inorganic insulating material.

The contact electrode 19E is provided in, for example, the element region R1. The contact electrode 19E is provided for each pixel P1 in the element region R1 to electrically connect the first electrode 31 and the readout circuit board 40 to each other. The adjacent contact electrodes 19E are electrically disconnected from each other by the embedded layer 18 and the interlayer insulating films 19A and 19B. The contact electrode 19E is formed of, for example, a copper (Cu) pad and is exposed to the joint surface S2. The dummy electrode 19ED is provided in, for example, the peripheral region R2. This dummy electrode 19ED is connected to a dummy electrode 22ED of the wiring layer 20W, which will be described later. By providing the dummy electrode 19ED and the dummy electrode 22ED, the strength of the peripheral region R2 can be improved. The dummy electrode 19ED is formed, for example, in the same process as the contact electrode 19E. The dummy electrode 19ED is formed of, for example, a copper (Cu) pad, and is exposed to the joint surface S2.

The first electrode 31 provided between the contact electrode 19E and the semiconductor layer 10S is an electrode (anode) to which a voltage for reading out a signal charge (a hole or an electron, the signal charge will hereinafter be described as a hole for convenience) generated in a photoelectric conversion layer 33 is supplied, and is provided for each pixel P1 in the element region R1. The first electrode 31 is provided to be embedded in an opening of the insulating film 17 in contact with the semiconductor layer 10S (more specifically, a diffusion region 32A, which will be described later). For example, the first electrode 31 is larger than the opening of the insulating film 17, and a part of the first electrode 31 is provided in the embedded layer 18. That is, an upper surface of the first electrode 31 (a surface on the semiconductor layer 10S side) is in contact with the diffusion region 32A, and a lower surface and a part of a side surface of the first electrode 31 are in contact with the embedded layer 18. The adjacent first electrodes 31 are electrically disconnected from each other by the insulating film 17 and the embedded layer 18.

The first electrode 31 is formed of, for example, any one simple substance of titanium (Ti), tungsten (W), titanium nitride (TiN), platinum (Pt), gold (Au), germanium (Ge), palladium (Pd), zinc (Zn), nickel (Ni), and aluminum (Al), or an alloy containing at least one of them. The first electrode 31 may be a single film of any of such constituent materials, or may be a stack film in which two or more of such constituent materials are combined. For example, the first electrode 31 is formed of a stack film including titanium and tungsten. The first electrode 31 has a thickness of, for example, several tens of nm to several hundreds of nm.

The semiconductor layer 10S includes, for example, a first contact layer 32, a photoelectric conversion layer 33, and a second contact layer 34 from a position close to the wiring layer 10W. The first contact layer 32, the photoelectric conversion layer 33, and the second contact layer 34 have the same planar shape, and their end surfaces are disposed at the same position in a plan view.

The first contact layer 32 is provided, for example, to be common to all of the pixels P1, and is disposed between the insulating film 17 and the photoelectric conversion layer 33. The first contact layer 32 is for electrically disconnecting adjacent pixels P1 from each other. For example, a plurality of diffusion regions 32A are provided in the first contact layer 32. By using a compound semiconductor material having a bandgap larger than that of a compound semiconductor material constituting the photoelectric conversion layer 33 for the first contact layer 32, a dark current can be suppressed. For the first contact layer 32, for example, n-type indium phosphide (InP) can be used.

The diffusion regions 32A provided in the first contact layer 32 are arranged to be spaced apart from each other. The diffusion region 32A is disposed for each pixel P1, and the first electrode 31 is connected to each diffusion region 32A. The diffusion region 32A is also provided in the OPB region R1B. The diffusion region 32A is for reading out the signal charge generated in the photoelectric conversion layer 33 for each pixel P1, and contains, for example, a p-type impurity. Examples of the p-type impurity include zinc (Zn) and the like. In this way, a p-n junction interface is formed between the diffusion region 32A and the first contact layer 32 other than the diffusion region 32A, such that adjacent pixels P1 are electrically disconnected from each other. The diffusion region 32A is provided, for example, in the first contact layer 32 in a thickness direction, and is also provided in a part of the photoelectric conversion layer 33 in the thickness direction.

The photoelectric conversion layer 33 is provided, for example, to be common to all of the pixels P1 between the first electrode 31 and the second electrode 15, more specifically between the first contact layer 32 and the second contact layer 34. The photoelectric conversion layer 33 absorbs light having a predetermined wavelength and generates a signal charge, and is formed of, for example, a compound semiconductor material such as an i-type Group III-V semiconductor. Examples of the compound semiconductor material constituting the photoelectric conversion layer 33 include indium gallium arsenide (InGaAs), indium arsenide antimonide (InAsSb), indium arsenide (InAs), indium antimonide (InSb), and mercury cadmium tellurium (HgCdTe). The photoelectric conversion layer 33 may be formed of germanium (Ge). In the photoelectric conversion layer 33, photoelectric conversion is performed with respect to light having a wavelength, for example, from a visible region to a short infrared region.

The second contact layer 34 is provided, for example, to be common to all of the pixels P1. The second contact layer 34 is provided between and in contact with the photoelectric conversion layer 33 and the second electrode 15. The second contact layer 34 is a region through which the charge discharged from the second electrode 15 moves, and is formed of, for example, a compound semiconductor containing an n-type impurity. For the second contact layer 34, for example, n-type indium phosphide (InP) can be used.

The second electrode 15 is provided on the second contact layer 34 (on the light incident side) and in contact with the second contact layer 34, for example, as an electrode that is common to each pixel P1. The second electrode 15 is for discharging a charge that is not used as a signal charge among the charges generated in the photoelectric conversion layer 33 (cathode). For example, when a hole is read out as a signal charge from the first electrode 31, an electron can be discharged through the second electrode 15. The second electrode 15 is formed of, for example, a conductive film capable of transmitting incident light such as infrared light. For the second electrode 15, for example, indium tin oxide (ITO), $In_2O_3$—$TiO_2$ (ITiO), or the like can be used. The second electrode 15 may be provided, for example, in a grid pattern to separate adjacent pixels P1 from each other. For the second electrode 15, a conductive material having a low light transmittance can be used.

The passivation film 16 covers the second electrode 15 from the light incident surface S1 side. The passivation film 16 may have an antireflection function. For the passivation film 16, for example, silicon nitride (SiN), aluminum oxide ($Al_2O_3$), silicon oxide ($SiO_2$), tantalum oxide ($Ta_2O_3$), or the like can be used. The passivation film 16 has an opening 16H in the OPB region R1B. The opening 16H is provided, for example, in a frame shape to surround the light receiving region (FIG. 1A). The opening 16H may be, for example, a quadrangular or circular hole in a plan view. Through the opening 16H of the passivation film 16, the conductive film 15B is electrically connected to the second electrode 15.

The insulating film 17 is provided between the first contact layer 32 and the embedded layer 18, while covering an end surface of the first contact layer 32, an end surface of the photoelectric conversion layer 33, an end surface of the second contact layer 34, and an end surface of the second electrode 15, and contacting the passivation film 16 in the peripheral region R2. The insulating film 17 includes an oxide, for example, silicon oxide ($SiO_X$) or aluminum oxide ($Al_2O_3$). The insulating film 17 may be formed to have a stack structure including a plurality of films. The insulating film 17 may be formed of, for example, a silicon (Si)-based insulating material such as silicon oxynitride (SiON), carbon-containing silicon oxide (SiOC), silicon nitride (SiN), or silicon carbide (SiC). The insulating film 17 has a thickness of, for example, several tens of nm to several hundreds of nm.

The conductive film 15B is provided from the OPB region R1B to the hole H1 of the peripheral region R2. The conductive film 15B is not only in contact with the second electrode 15 through the opening 16H of the passivation film 16 provided in the OPB region R1B, but also in contact with wiring (wiring 22CB, which will be described later) of the readout circuit board 20 through the hole H1. In this way, a voltage is supplied from the readout circuit board 40 to the second electrode 15 via the conductive film 15B. The conductive film 15B forms the OPB region R1B while functioning as not only such a path for supplying a voltage to the second electrode 15 but also a light-shielding film. The conductive film 15B is formed of, for example, a metal material including tungsten (W), aluminum (Al), titanium (Ti), molybdenum (Mo), tantalum (Ta), or copper (Cu). A passivation film may be provided on the conductive film 15B.

An adhesive layer B may be provided between an end portion of the second contact layer 34 and the second electrode 15. As will be described later, the adhesive layer B is used when forming the light receiving element 110, and serves to join the semiconductor layer 10S to a temporary substrate. The adhesive layer B is formed of, for example, tetraethoxysilane (TEOS) or silicon oxide ($SiO_2$). The adhesive layer B is provided, for example, to extend beyond the end surface of the semiconductor layer 10S, and is covered with the embedded layer 18 together with the semiconductor layer 10S. The insulating film 17 is provided between the adhesive layer B and the embedded layer 18.

In the light receiving element 110, the photoelectric conversion layer 33 (photodiode PD) is formed in the element substrate 30. Further, the transfer transistor TG, the reset transistor RST, the amplification transistor AMP, and the selection transistor SEL, and the NMOS transistor Mn1, and the switch SW1, and the capacitor Ca included in the overlight amount detection circuit 1, or the PMOS transistor Mp1, the switch SW1, and the capacitor Cb included in the overlight amount detection circuit 1a are all formed in the readout circuit board 40.

These elements provided in the readout circuit board 40, including the transfer transistor TG, the reset transistor RST, the amplification transistor AMP, and the selection transistor SEL, and the NMOS transistor Mn1, and the switch SW1, and the capacitor Ca included in the overlight amount detection circuit 1, or the PMOS transistor Mp1, the switch SW1, and the capacitor Cb included in the overlight amount detection circuit 1a, may be dividedly formed in a plurality of substrates or chips, or some of these elements may be formed in the substrate where the photoelectric conversion layer 33 is formed.

In this way, the overlight amount detection circuit 1 or 1a is provided in the readout circuit board 40 when applied to the light receiving element 110. Accordingly, the overlight amount detection circuit 1 or 1a can detect reception of light in an overlight amount by the image sensor with high accuracy without increasing a circuit scale of the light receiving element 110.

Figure 16:
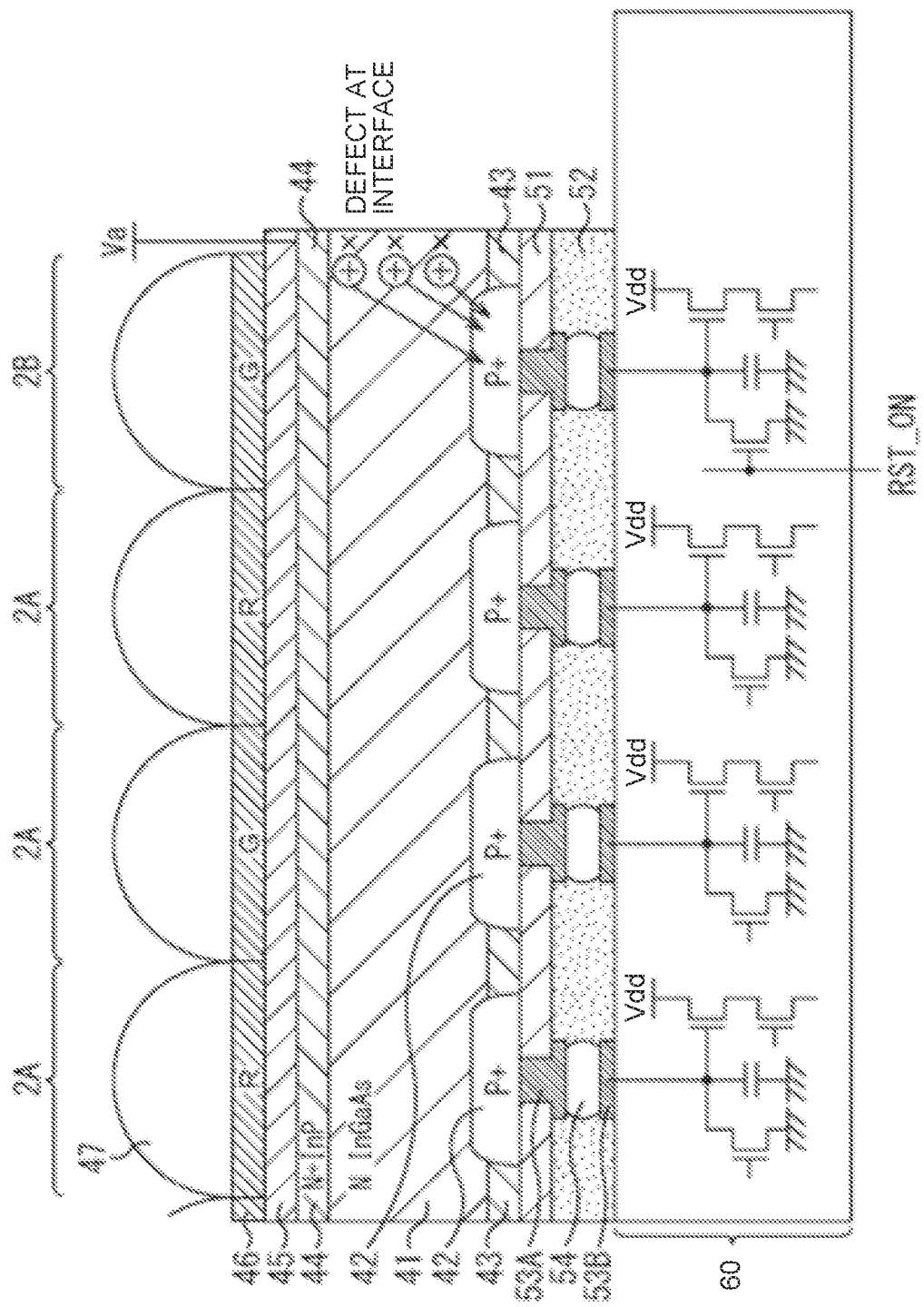
FIG. 16 is a cross-sectional view illustrating a pixel structure to which the overlight amount detection circuit according to the present disclosure is applied.

An example of a pixel structure to which the overlight amount detection circuit according to the present disclosure is applied will be described with reference to FIG. 16. FIG. 16 is a cross-sectional view illustrating a pixel structure to which the overlight amount detection circuit according to the present disclosure is applied.

An element substrate is provided on an upper side, i.e., the light incident side, of a semiconductor substrate 60, which is an example of the circuit board. An N-type semiconductor thin film 41, which serves as a photoelectric conversion unit, is formed on an entire surface of a pixel array region in the element substrate. For the N-type semiconductor thin film 41, an InGaP, InAlP, InGaAs, InAlAs, or chalcopyrite-structure compound semiconductor is used. The chalcopyrite-structure compound semiconductor is a material with which a high light absorption coefficient and a high sensitivity over a wide wavelength range can be obtained, and is preferably used as the N-type semiconductor thin film 41 for photoelectric conversion. Such a chalcopyrite-structure compound semiconductor is formed using elements around Group IV elements such as Cu, Al, Ga, In, S, and Se, and examples thereof include CuGaInS-based mixed crystal, CuAlGaInS-based mixed crystal, and CuAlGaInSSe-based mixed crystal.

Further, as a material of the N-type semiconductor thin film 41, in addition to the above-described compound semiconductor, amorphous silicon (Si), germanium (Ge), a quantum dot photoelectric conversion film, an organic photoelectric conversion film, or the like can also be used. In the present embodiment, it is assumed that the InGaAs compound semiconductor is used as the N-type semiconductor thin film 41.

A high-concentration P-type layer 42 constituting a pixel electrode is formed for each pixel on a lower side, i.e. the semiconductor substrate 60 side, of the N-type semiconductor thin film 41. Then, an N-type layer 43 is formed of, for example, a compound semiconductor such as InP between the high-concentration P-type layers 42 formed for the respective pixels as a pixel separation region for separating the pixels from each other. The N-type layer 43 not only functions as a pixel separation region, but also serves to prevent a dark current.

On the other hand, an N-type layer 44, which is also used as a pixel separation region, is formed on an upper side, i.e. the light incident side, of the N-type semiconductor thin film 41, the N-type layer 44 having a higher concentration than the N-type semiconductor thin film 41 by using a compound semiconductor such as InP. The high-concentration N-type layer 44 functions as a barrier layer for preventing the backflow of charges generated in the N-type semiconductor thin film 41. As a material for the high-concentration N-type layer 44, for example, a compound semiconductor such as InGaAs, InP, or InAlAs can be used.

An antireflection film 45 is formed on the high-concentration N-type layer 44 as a barrier layer. As a material of the antireflection film 45, for example, silicon nitride (SiN), hafnium oxide (HfO$_2$), aluminum oxide (Al$_2$O$_3$), zirconium oxide (ZrO$_2$), tantalum oxide (Ta$_2$Ta$_5$), titanium oxide (TiO$_2$), or the like can be used.

Either the high-concentration N-type layer 44 or the antireflection film 45 also functions as an upper one of electrodes with the N-type semiconductor thin film 41 being sandwiched therebetween in a vertical direction, and a predetermined voltage Va is applied to the high-concentration N-type layer 44 or the antireflection film 45 as the upper electrode.

A color filter 46 and an on-chip lens 47 are further formed on the antireflection film 45. The color filter 46 is a filter transmitting light (light having a wavelength) of red (R), green (G), and blue (B), and is arranged, for example, in a so-called Bayer array in the pixel array region 3.

A passivation layer 51 and an insulating layer 52 are formed under the high-concentration P-type layer 42 constituting the pixel electrode and the N-type layer 43 as the pixel separation region. Then, connection electrodes 53A and 53B and a bump electrode 54 are formed to penetrate through the passivation layer 51 and the insulating layer 52. The connection electrodes 53A and 53B and the bump electrode 54 electrically connect the high-concentration P-type layer 42 constituting the pixel electrode to a capacitive element storing charges.

The overlight amount detection circuit 1 or 1a is provided on the semiconductor substrate 60, which is an example of the circuit board, when applied to the pixel structure illustrated in FIG. 16. Accordingly, the overlight amount detection circuit 1 or 1a can detect reception of light in an overlight amount by the image sensor with high accuracy without increasing a circuit scale of the pixel structure illustrated in FIG. 16.

10. Example of Application to Endoscopic Surgery System

The technology according to the present disclosure (the present technology) can be applied to various products. As a specific example, the overlight amount detection circuit 1 or 1a can be applied to an infrared light receiving element, or an imaging device, an electronic device, or the like using the same.

The overlight amount detection circuit 1 or 1a is applied to a wide range of imaging and sensing, not only for ordinary digital cameras and cameras mounted on smartphones, but also for surveillance cameras, cameras for industrial equipment used for inspections in factories, distance measuring sensors such as time of flight (ToF) sensors, infrared sensors, and the like. For example, the technology according to the present disclosure may be applied to an endoscopic surgery system.

Figure 17:
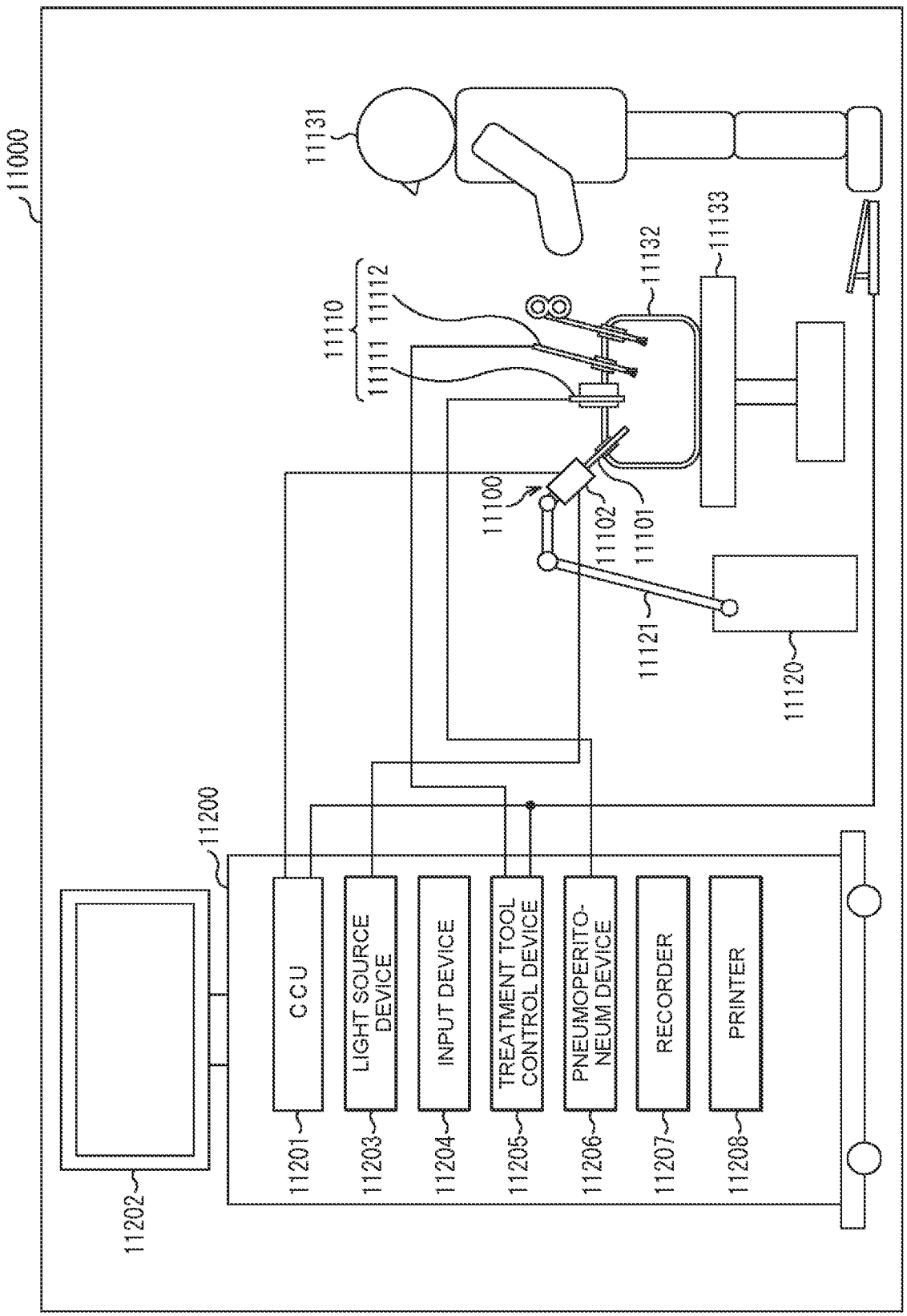
FIG. 17 is a diagram illustrating an example of a schematic configuration of an endoscopic surgery system.

FIG. 17 is a diagram illustrating an example of a schematic configuration of an endoscopic surgery system to which the technology according to the present disclosure (the present technology) can be applied.

In FIG. 17, it is illustrated that an operator (doctor) 11131 is performing surgery on a patient 11132 on a patient bed 11133 using an endoscopic surgery system 11000. As illustrated, the endoscopic surgery system 11000 includes an endoscope 11100, other surgical tools 11110 such as a pneumoperitoneum tube 11111 and an energy treatment tool 11112, a support arm device 11120 supporting the endoscope 11100, and a cart 11200 on which various kinds of devices for endoscopic surgery are mounted.

The endoscope 11100 includes a lens barrel 11101 whose region of a predetermined length from a front end thereof is inserted into a somatic cavity of the patient 11132, and a camera head 11102 connected to a rear end of the lens barrel 11101. In the illustrated example, the endoscope 11100 is configured as a so-called rigid scope having the lens barrel 11101 that is rigid. However, the endoscope 11100 may be configured as a so-called flexible scope having a lens barrel that is flexible.

An opening into which an objective lens has been fitted is provided at the front end of the lens barrel 11101. A light source device 11203 is connected to the endoscope 11100, light generated by the light source device 11203 is guided up to the front end of the lens barrel by a light guide that is provided to extend inside the lens barrel 11101, and the light is irradiated toward an observation target in the somatic cavity of the patient 11132 via the objective lens. Note that the endoscope 11100 may be a forward-viewing scope, an oblique-viewing scope, or a side-viewing scope.

An optical system and an imaging element are provided inside the camera head 11102, and reflected light (observation light) from the observation target is condensed on the imaging element by the optical system. The observation light is photoelectrically converted by the imaging element, and an electric signal corresponding to the observation light, that is, an image signal corresponding to the observation image is generated. The image signal is transmitted to a camera control unit (CCU) 11201 as RAW data.

The CCU 11201 includes a central processing unit (CPU), a graphics processing unit (GPU), etc., and comprehensively controls the operations of the endoscope 11100 and a display device 11202. Further, the CCU 11201 receives an image signal from the camera head 11102, and performs various kinds of image processing for displaying an image based on the image signal, for example, development processing (demosaicing processing) and the like, on the image signal.

The display device 11202 displays an image based on the image signal subjected to the image processing by the CCU 11201 according to the control of the CCU 11201.

The light source device 11203 includes a light source, for example, a light emitting diode (LED) or the like, and supplies irradiation light to the endoscope 11100 at the time of imaging a surgical site or the like.

An input device 11204 is an input interface for the endoscopic surgery system 11000. A user can input various kinds of information and instructions to the endoscopic surgery system 11000 via the input device 11204. For example, the user inputs an instruction for changing an imaging condition of the endoscope 11100 (such as type of irradiation light, magnification, or focal length) or the like.

A treatment tool control device 11205 controls driving of the energy treatment tool 11112 for cauterization or incision of tissue, sealing of a blood vessel, or the like. A pneumoperitoneum device 11206 feeds gas into the somatic cavity of the patient 11132 via the pneumoperitoneum tube 11111 to inflate the somatic cavity of the patient 11132 for the purpose of securing a visual field for the endoscope 11100 and securing a working space for the operator. A recorder 11207 is a device capable of recording various kinds of information regarding surgery. The printer 11208 is a device capable of printing out various kinds of information regarding surgery in any format such as text, image, or graph.

Note that the light source device 11203 supplying irradiation light to the endoscope 11100 at the time of imaging a surgical site can include, for example, an LED, a laser light source, or a white light source constituted by a combination thereof. In a case where the white light source is constituted by a combination of RGB laser light sources, it is possible to control an output intensity and an output timing of each color (each wavelength) with high accuracy, thereby adjusting a white balance of an image to be captured in the light source device 11203. Furthermore, in this case, by irradiating the observation target with laser light from each of the RGB laser light sources in a time division manner and controlling the driving of the imaging element in the camera head 11102 in synchronization with the irradiation timing, an image corresponding to each of RGB can be captured in a time division manner. According to this method, a color image can be obtained without providing color filters in the imaging element.

In addition, the driving of the light source device 11203 may be controlled to change an intensity of light to be output every predetermined time interval. By controlling the driving of the imaging element in the camera head 11102 in synchronization with the timing at which the intensity of the light is changed to acquire an image in a time division manner and synthesizing the image, a high dynamic range image without so-called underexposure and overexposure can be generated.

In addition, the light source device 11203 may be configured to be able to supply light having a predetermined wavelength band corresponding to special light observation. In the special light observation, so-called narrow band imaging is performed to image predetermined tissue such as a blood vessel of a superficial portion of a mucous membrane with high contrast, by irradiating light having a narrower band than irradiation light (that is, white light) at the time of normal observation, for example, using the fact that absorption of light by body tissue depends on a wavelength of the light Alternatively, in the special light observation, fluorescence observation may be performed to obtain an image using fluorescence generated by irradiating excitation light. In the fluorescence observation, fluorescence can be observed from body tissue by irradiating the body tissue with excitation light (autofluorescence observation), or a fluorescent image can be obtained by locally injecting a reagent such as indocyanine green (ICG) into body tissue and irradiating the body tissue with excitation light corresponding to a fluorescence wavelength of the reagent. The light source device 11203 can be configured to be able to supply narrow band light and/or excitation light corresponding to such special light observation.

Figure 18:
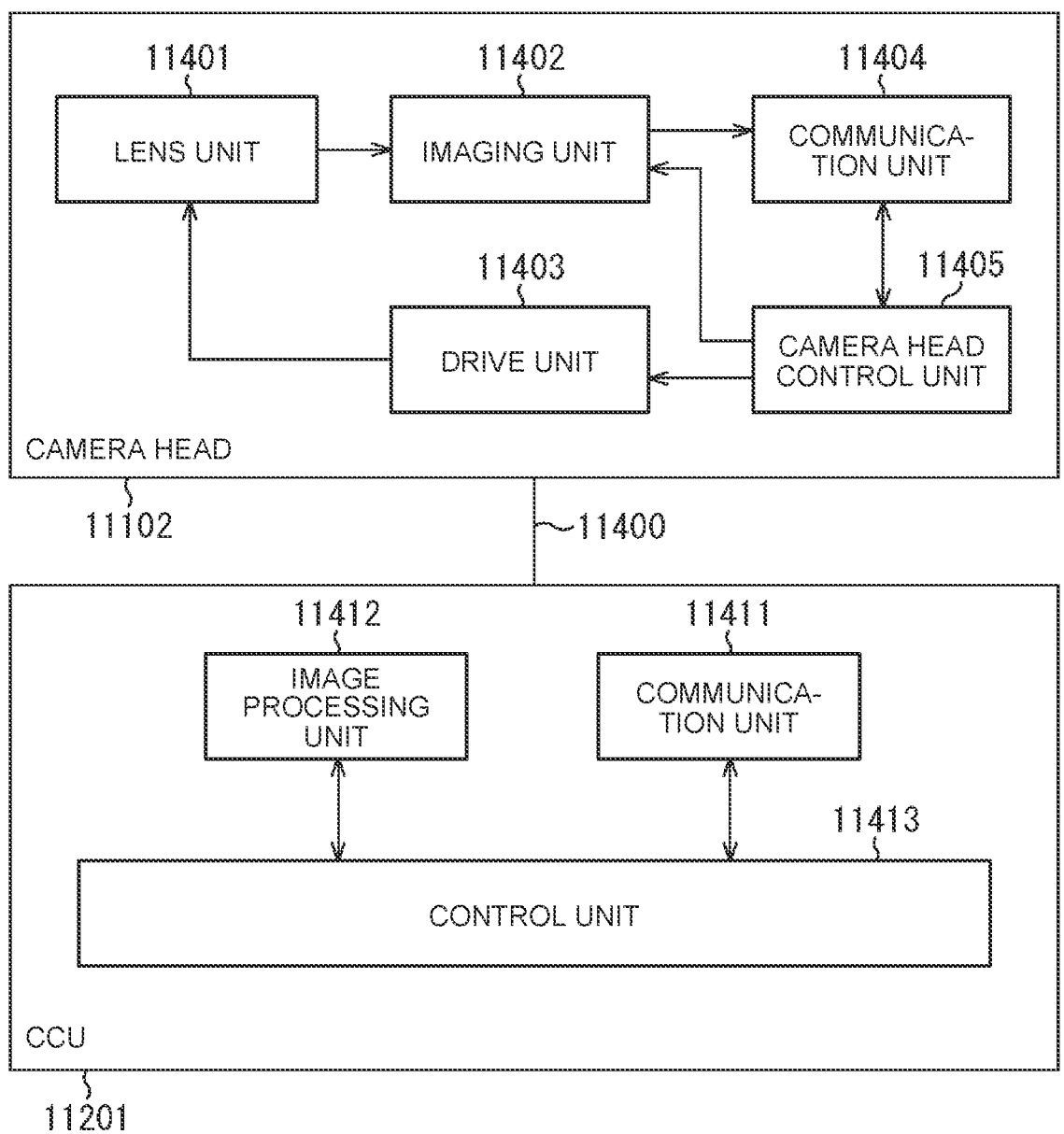
FIG. 18 is a block diagram illustrating an example of a functional configuration between a camera head and a CCU.

FIG. 18 is a block diagram illustrating an example of a functional configuration between the camera head 11102 and the CCU 11201 illustrated in FIG. 17.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other by a transmission cable 11400.

The lens unit 11401 is an optical system provided in a portion for connection with the lens barrel 11101. The observation light taken in from the front end of the lens barrel 11101 is guided to the camera head 11102 and incident on the lens unit 11401. The lens unit 11401 is configured by combining a plurality of lenses including a zoom lens and a focus lens.

The imaging unit 11402 includes an imaging element. The imaging unit 11402 may include one imaging element (so-called single-plate type) or a plurality of imaging elements (so-called multi-plate type). In a case where the imaging unit 11402 is configured in the multi-plate type, for example, image signals corresponding to RGB, respectively, may be generated by the respective imaging elements, and the generated image signals may be combined together, thereby obtaining a color image. Alternatively, the imaging unit 11402 may include a pair of imaging elements for acquiring image signals corresponding to three-dimensional (3D) display for a right eye and for a left eye, respectively. The 3D display enables an operator 11131 to grasp a depth of biological tissue more accurately at a surgical site. Note that, in a case where the imaging unit 11402 is configured in the multi-plate type, a plurality of lens units 11401 can be provided to correspond to the respective imaging elements.

In addition, the imaging unit 11402 is not necessarily provided in the camera head 11102. For example, the imaging unit 11402 may be provided immediately after the objective lens inside the lens barrel 11101.

The drive unit 11403 includes an actuator, and moves the zoom lens and the focus lens of the lens unit 11401 by a predetermined distance along an optical axis according to control of the camera head control unit 11405. Thus, a magnification and a focus for an image to be captured by the imaging unit 11402 can be appropriately adjusted.

The communication unit 11404 includes a communication device for transmitting and receiving various kinds of information to and from the CCU 11201. The communication unit 11404 transmits an image signal obtained from the imaging unit 11402 as RAW data to the CCU 11201 via the transmission cable 11400.

In addition, the communication unit 11404 receives a control signal for controlling driving of the camera head 11102 from the CCU 11201, and supplies the control signal to the camera head control unit 11405. The control signal includes information regarding imaging conditions, for example, information for specifying a frame rate for an image to be captured, information for specifying an exposure value at an imaging time, and/or information for specifying a magnification and a focus for an image to be captured, and the like.

Note that the imaging conditions such as frame rate, exposure value, magnification, and focus may be appropriately specified by the user, or may be automatically set by the control unit 11413 of the CCU 11201 on the basis of the acquired image signal. In the latter case, the endoscope 11100 has so-called auto exposure (AE), auto focus (AF), and auto white balance (AWB) functions.

The camera head control unit 11405 controls driving of the camera head 11102 on the basis of the control signal received from the CCU 11201 via the communication unit 11404.

The communication unit 11411 includes a communication device for transmitting and receiving various kinds of information to and from the camera head 11102. The communication unit 11411 receives an image signal transmitted from the camera head 11102 via the transmission cable 11400.

In addition, the communication unit 11411 transmits a control signal for controlling driving of the camera head 11102 to the camera head 11102. The image signal and the control signal can be transmitted by electric communication, optical communication, or the like.

The image processing unit 11412 performs various kinds of image processing on the image signal that is RAW data transmitted from the camera head 11102.

The control unit 11413 performs various kinds of control relating to imaging of a surgical site or the like by the endoscope 11100 and displaying of a captured image obtained by imaging the surgical site or the like. For example, the control unit 11413 generates a control signal for controlling driving of the camera head 11102.

In addition, the control unit 11413 causes the display device 11202 to display the captured image of the surgical site or the like on the basis of the image signal subjected to the image processing by the image processing unit 11412. At this time, the control unit 11413 may recognize various objects in the captured image using various image recognition technologies. For example, the control unit 11413 can recognize a surgical tool such as forceps, a specific biological part, bleeding, a mist at the time of using the energy treatment tool 11112, and the like by detecting edge shapes, colors, and the like of the objects included in the captured image. When displaying the captured image on the display device 11202, the control unit 11413 may superimpose various kinds of surgery support information on the image of the surgical site by using the recognition result. Since the superimposed display of the surgery support information is presented to the operator 11131, it is possible to lessen burden on the operator 11131, and the operator 11131 can reliably proceed with surgery.

The transmission cable 11400 connecting the camera head 11102 and the CCU 11201 to each other is an electric signal cable dealing with electric signal communication, an optical fiber dealing with optical communication, or a composite cable thereof.

Here, in the illustrated example, communication is performed in a wired manner using the transmission cable 11400. However, communication between the camera head 11102 and the CCU 11201 may be performed in a wireless manner.

An example of the endoscopic surgery system to which the technology according to the present disclosure can be applied has been described above. The technology according to the present disclosure can be applied to, for example, the endoscope 11100, the imaging unit 11402 of the camera head 11102, the image processing unit 11412 of the CCU 11201, or the like among the above-described components. Specifically, for example, the overlight amount detection circuit 1 of FIG. 11 can be applied to the imaging unit 10402. By applying the technology according to the present disclosure to the imaging unit 10402, the influence of the overlight amount can be eliminated, thereby obtaining a clearer image of a surgical site, so that the operator can reliably identify the surgical site.

Note that although the endoscopic surgery system has been described as an example here, the technology according to the present disclosure may also be applied to, for example, another microscopic surgery system or the like.

11. Example of Application to Moving Body

In addition, the technology according to the present disclosure (the present technology) may be realized as a device mounted on any type of mobile body, for example, an automobile, an electric vehicle, a hybrid electric vehicle, a motorcycle, a bicycle, a personal mobility, an airplane, a drone, a ship, or a robot.

Figure 19:
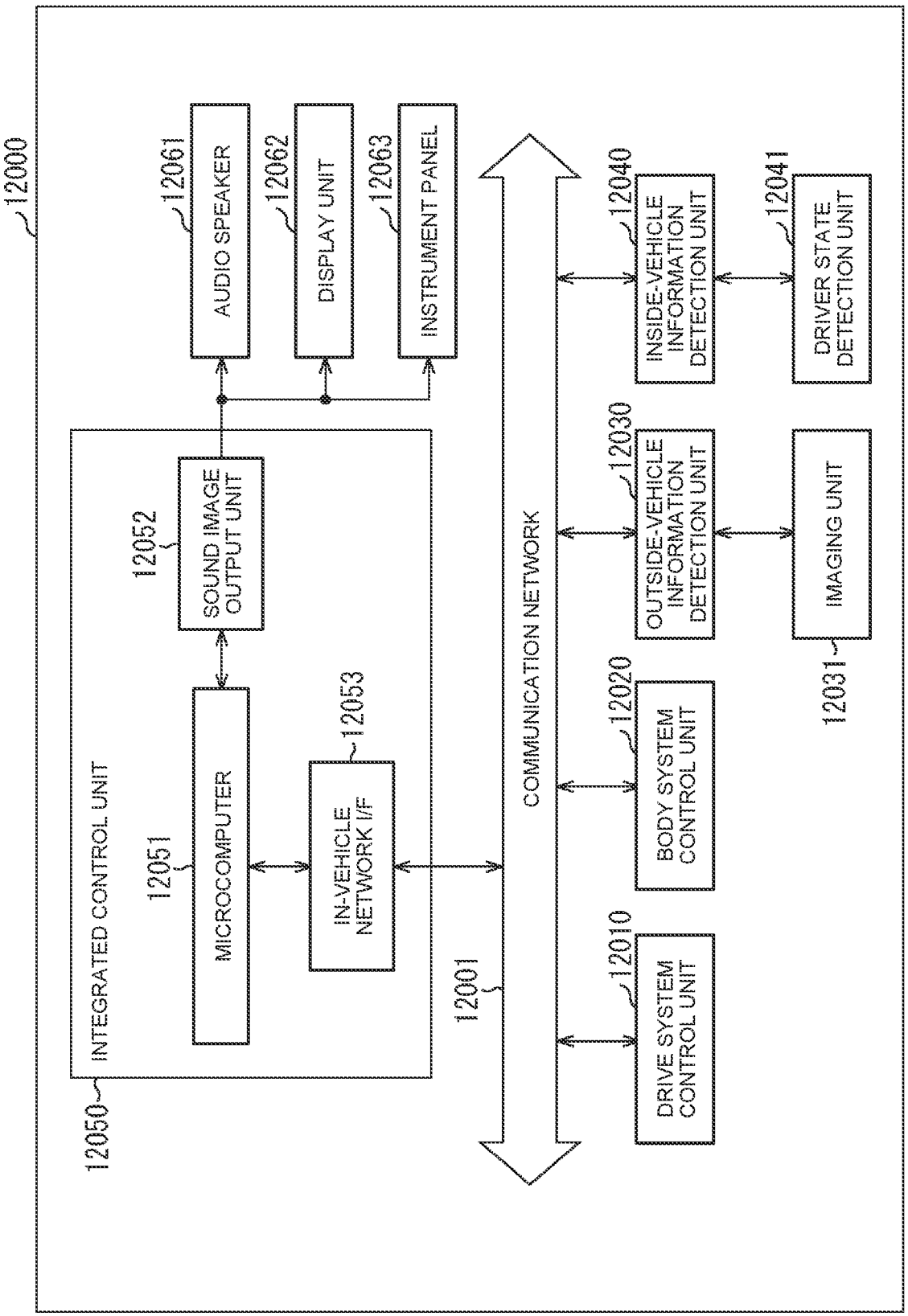
FIG. 19 is a block diagram illustrating a schematic configuration example of a vehicle control system.

FIG. 19 is a block diagram illustrating a schematic configuration example of a vehicle control system as an example of a moving body control system to which the technology according to the present disclosure can be applied.

A vehicle control system 12000 includes a plurality of electronic control units connected to each other via a communication network 12001. In the example illustrated in FIG. 19, the vehicle control system 12000 includes a drive system control unit 12010, a body system control unit 12020, an outside-vehicle information detection unit 12030, an inside-vehicle information detection unit 12040, and an integrated control unit 12050. Furthermore, as functional components of the integrated control unit 12050, a microcomputer 12051, a sound image output unit 12052, and an in-vehicle network interface (I/F) 12053 are illustrated.

The drive system control unit 12010 controls operations of devices related to a drive system of a vehicle according to various programs. For example, the drive system control unit 12010 functions as a device for controlling a driving force generation device for generating a driving force of the vehicle such as an internal combustion engine or a driving motor, a driving force transmission mechanism for transmitting the driving force to wheels, a steering mechanism adjusting a steering angle of the vehicle, a braking device generating a braking force of the vehicle, and the like.

The body system control unit 12020 controls operations of various devices mounted on a vehicle body according to various programs. For example, the body system control unit 12020 functions as a device for controlling a keyless entry system, a smart key system, a power window device, or various types of lamps such as a head lamp, a back lamp, a brake lamp, a blinker, and a fog lamp. In this case, radio waves transmitted from a portable machine substituting for a key or signals of various switches can be input to the body system control unit 12020. The body system control unit 12020 receives these radio waves or signals input thereto, and controls a door lock device, a power window device, a lamp, and the like of the vehicle.

The outside-vehicle information detection unit 12030 detects information on the outside of the vehicle on which the vehicle control system 12000 is mounted. For example, an imaging unit 12031 is connected to the outside-vehicle information detection unit 12030. The outside-vehicle information detection unit 12030 causes the imaging unit 12031 to capture an image of the outside of the vehicle, and receives the captured image. The outside-vehicle information detection unit 12030 may perform object detection processing or distance detection processing with respect to a person, a vehicle, an obstacle, a sign, a character on a road surface, or the like on the basis of the received image.

The imaging unit 12031 is an optical sensor receiving light and outputting an electric signal corresponding to an amount of the received light. The imaging unit 12031 can output the electric signal as an image or as distance measurement information. In addition, the light received by the imaging unit 12031 may be visible light or invisible light such as infrared light.

The inside-vehicle information detection unit 12040 detects information on the inside of the vehicle. For example, a driver state detection unit 12041 detecting a driver's state is connected to the inside-vehicle information detection unit 12040. The driver state detection unit 12041 includes, for example, a camera imaging the driver. On the basis of detection information input from the driver state detection unit 12041, the inside-vehicle information detection unit 12040 may calculate a degree of fatigue or a degree of concentration of the driver or may determine whether or not the driver is dozing off.

The microcomputer 12051 can calculate a control target value for the driving force generation device, the steering mechanism, or the braking device on the basis of the information on the inside or the outside of the vehicle acquired from the outside-vehicle information detection unit 12030 or the inside-vehicle information detection unit 12040, and output a control command to the drive system control unit 12010. For example, the microcomputer 12051 can perform cooperative control for the purpose of realizing functions of an advanced driver assistance system (ADAS) including collision avoidance or impact mitigation of the vehicle, follow-up traveling based on a distance between vehicles, constant-speed vehicle traveling, warning of vehicle collision, warning of vehicle lane departure, and the like.

Furthermore, the microcomputer 12051 can perform cooperative control for the purpose of automatic driving to autonomously travel or the like, rather than depending on a driver's operation, by controlling the driving force generation device, the steering mechanism, the braking device, or the like on the basis of the information on surroundings of the vehicle acquired from the outside-vehicle information detection unit 12030 or the inside-vehicle information detection unit 12040.

In addition, the microcomputer 12051 can output a control command to the body system control unit 12020 on the basis of the information on the outside of the vehicle acquired from the outside-vehicle information detection unit 12030. For example, the microcomputer 12051 can perform cooperative control for the purpose of preventing glare, such as switching from a high beam to a low beam, by controlling the head lamp according to a position of a preceding vehicle or an opposite vehicle detected by the outside-vehicle information detection unit 12030.

The sound image output unit 12052 transmits an output signal of at least one of a sound and an image to an output device capable of visually or acoustically notifying an occupant of the vehicle or the outside of the vehicle of information. In the example of FIG. 19, an audio speaker 12061, a display unit 12062, and an instrument panel 12063 are illustrated as the output device. For example, the display unit 12062 may include at least one of an on-board display and a head-up display.

Figure 20:
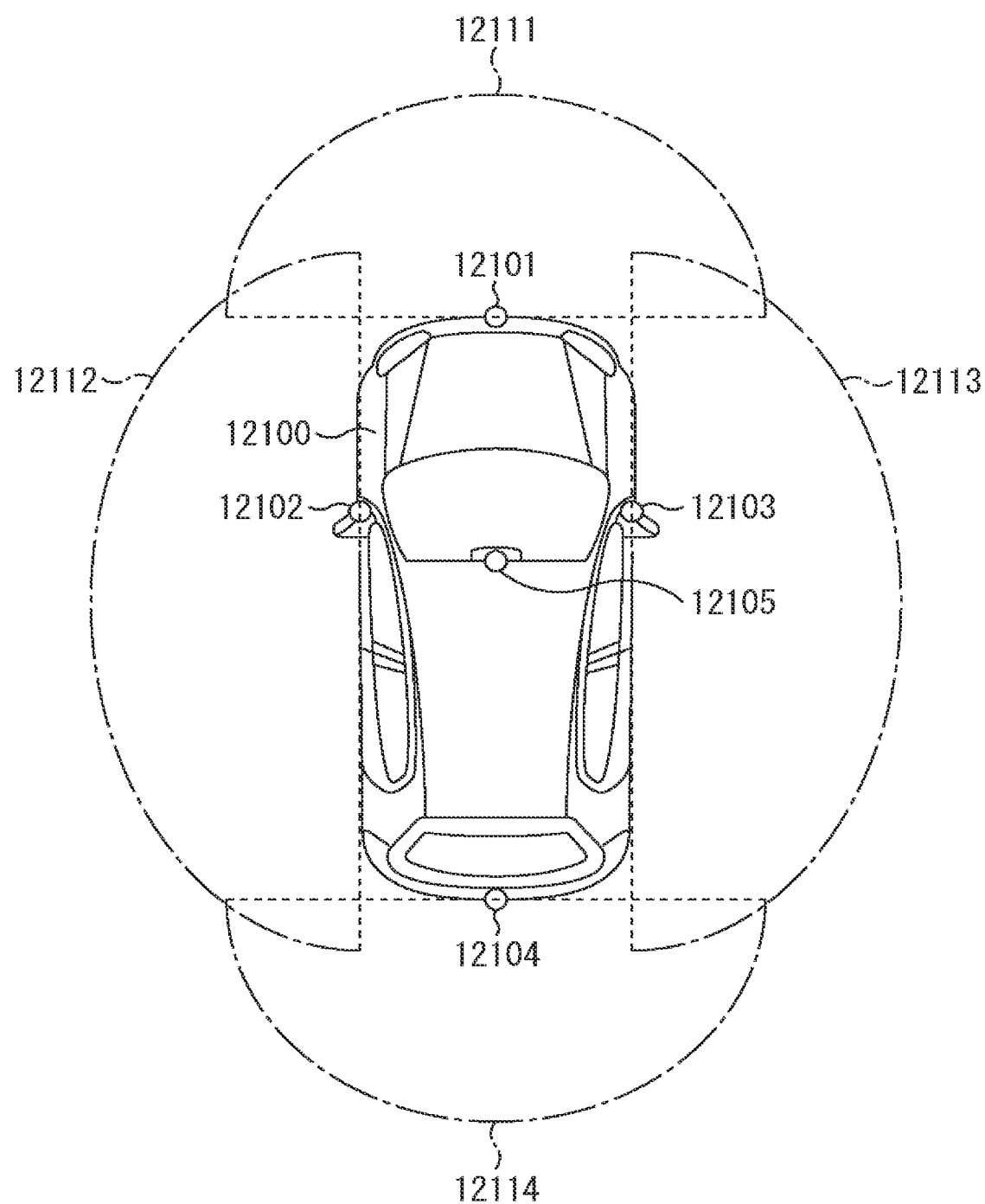
FIG. 20 is an explanatory diagram illustrating examples of positions at which an outside-vehicle information detection part and an imaging unit are provided.

FIG. 20 is a diagram illustrating an example of a position at which the imaging unit 12031 is installed.

In FIG. 20, a vehicle 12100 includes imaging units 12101, 12102, 12103, 12104, and 12105 as the imaging unit 12031.

The imaging units 12101, 12102, 12103, 12104, and 12105 are positioned, for example, at a front nose, at a side mirror, at a rear bumper, at a back door, and at an upper portion of a windshield in the interior of the vehicle 12100. The imaging unit 12101 provided at the front nose and the imaging unit 12105 provided at the upper portion of the windshield in the interior of the vehicle mainly acquire images in front of the vehicle 12100. The imaging units 12102 and 12103 provided at the side mirrors mainly acquire images around the sides of the vehicle 12100. The imaging unit 12104 provided at the rear bumper or the back door mainly acquires images behind the vehicle 12100. The front images acquired by the imaging units 12101 and 12105 are mainly used for detecting a preceding vehicle, a pedestrian, an obstacle, a traffic light, a traffic sign, a lane, and the like.

Note that an example of an imaging range of each of the imaging units 12101 to 12104 is illustrated in FIG. 20. An imaging range 12111 indicates an imaging range of the imaging unit 12101 provided at the front nose, imaging ranges 12112 and 12113 indicate imaging ranges of the imaging units 12102 and 12103 provided at the side mirrors, respectively, and an imaging range 12114 indicates an imaging range of the imaging unit 12104 provided at the rear bumper or the back door. For example, a bird's-eye view image of the vehicle 12100 as viewed from above is obtained by superimposing image data captured by the imaging units 12101 to 12104.

At least one of the imaging units 12101 to 12104 may have a function of acquiring distance information. For example, at least one of the imaging units 12101 to 12104 may be a stereo camera including a plurality of imaging elements, or may be an imaging element having pixels for detecting a phase difference.

For example, the microcomputer 12051 can obtain a distance to each three-dimensional object in the imaging ranges 12111 to 12114 and a temporal change of the distance (a relative speed with respect to the vehicle 12100) on the basis of the distance information obtained from the imaging units 12101 to 12104, thereby extracting, as a preceding vehicle, a three-dimensional object traveling at a predetermined speed (for example, 0 km/h or more) in the substantially same direction as the vehicle 12100, in particular, a three-dimensional object closest to the vehicle 12100 on a traveling track. In addition, the microcomputer 12051 can set an inter-vehicle distance to be secured in advance with respect to an immediate preceding vehicle to perform automatic brake control (including follow-up stop control), automatic acceleration control (including follow-up start control), and the like. As described above, it is possible to perform cooperative control for the purpose of automatic driving to autonomously travel or the like, rather than depending on a driver's operation.

For example, on the basis of the distance information obtained from the imaging units 12101 to 12104, the microcomputer 12051 can classify three-dimensional object data related to three-dimensional objects into a two-wheel vehicle, an ordinary vehicle, a large vehicle, a pedestrian, and other three-dimensional objects such as a utility pole, and extract the classified three-dimensional object data to be used in automatically avoiding an obstacle. For example, the microcomputer 12051 identifies obstacles around the vehicle 12100 as obstacles that can be visually recognized by the driver of the vehicle 12100 and obstacles that are difficult for the driver of the vehicle 12100 to visually recognize. Then, the microcomputer 12051 can determine a risk of collision indicating a degree of risk of collision with each obstacle. In a situation where the degree of risk of collision is higher than or equal to a set value, which indicates that there is a possibility of collision, the microcomputer 12051 can perform driving assistance to avoid the collision by outputting an alert to the driver via the audio speaker 12061 or the display unit 12062 or performing forcible deceleration or collision avoidance steering via the drive system control unit 12010.

At least one of the imaging units 12101 to 12104 may be an infrared camera detecting infrared light. For example, the microcomputer 12051 can recognize a pedestrian by determining whether or not there is a pedestrian in images captured by the imaging units 12101 to 12104. The pedestrian is recognized, for example, by extracting feature points in the images captured by the imaging units 12101 to 12104 as infrared cameras and performing pattern matching processing on a series of feature points indicating an outline of an object to determine whether or not the object is a pedestrian. When the microcomputer 12051 recognizes a pedestrian by determining that there is a pedestrian in the images captured by the imaging units 12101 to 12104, the sound image output unit 12052 controls the display unit 12062 to display a square contour line to be superimposed on the recognized pedestrian for emphasis. Furthermore, the sound image output unit 12052 may control the display unit 12062 to display an icon or the like indicating a pedestrian at a desired position.

An example of the vehicle control system to which the technology according to the present disclosure can be applied has been described above. The technology according to the present disclosure can be applied to, for example, the imaging unit 12031 or the like among the above-described components. Specifically, the overlight amount detection circuit 1 of FIG. 11 can be applied to the imaging unit 12031. By applying the technology according to the present disclosure to the imaging unit 12031, an occurrence of a sunspot can be suppressed, thereby obtaining a captured image that is easier to see, and accordingly, reducing driver's fatigue.

12. Example of Application to Electronic Device

The overlight amount detection circuit 1 or 1a described above can be applied to various electronic devices, for example, an imaging device such as a digital still camera or a digital video camera, a mobile phone having an imaging function, or another device having an imaging function.

Figure 21:
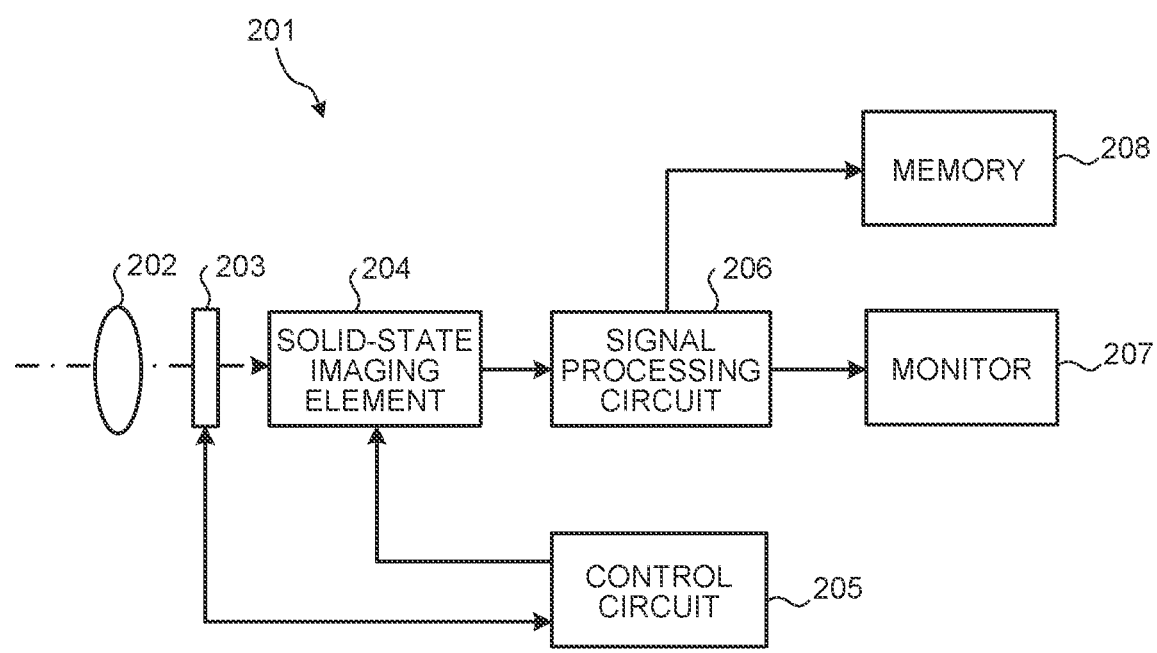
FIG. 21 is a block diagram illustrating a configuration example of an imaging device as an electronic device to which the technology according to the present disclosure is applied.

FIG. 21 is a block diagram illustrating a configuration example of an imaging device as an electronic device to which the overlight amount detection circuit 1 or 1a according to the present disclosure is applied.

An imaging device 201 illustrated in FIG. 21 includes an optical system 202, a shutter device 203, a solid-state imaging element 204, a control circuit 205, a signal processing circuit 206, a monitor 207, and a memory 208, and can capture still images and moving images.

The optical system 202 includes one or more lenses, and guides light (incident light) from a subject to the solid-state imaging element 204 to form an image on a light receiving surface of the solid-state imaging element 204.

The shutter device 203 is disposed between the optical system 202 and the solid-state imaging element 204, and controls a light irradiation period and a light shielding period with respect to the solid-state imaging element 204 according to the control of the control circuit 205.

The solid-state imaging element 204 is configured by a package including the above-described overlight amount detection circuit 1 or 1a. The solid-state imaging element 204 accumulates a signal charge for a certain period of time according to the light received on the light receiving surface via the optical system 202 and the shutter device 203 to form an image. The signal charge stored in the solid-state imaging element 204 is transferred in response to a drive signal (timing signal) supplied from the control circuit 205.

The control circuit 205 outputs the drive signal for controlling a transfer operation of the solid-state imaging element 204 and a shutter operation of the shutter device 203 to drive the solid-state imaging element 204 and the shutter device 203.

The signal processing circuit 206 performs various kinds of signal processing on the signal charge output from the solid-state imaging element 204. An image (image data) obtained by the signal processing circuit 206 performing signal processing is supplied to the monitor 207 to be displayed, or supplied to the memory 208 to be stored (recorded).

The imaging device 201 configured as described above also can detect an overlight amount with high accuracy without increasing a circuit scale by installing the overlight amount detection circuit 1 or 1a in the above-described solid-state imaging element 204.

13. Effects

The overlight amount detection circuit 1 or 1a includes a MOS transistor Mn1 or Mp1 and a capacitor Ca or Cb, which is a high-impedance element. A source of the MOS transistor Mn1 or Mp1 is connected to a vertical signal line VSL of the image sensor. The capacitor Ca or Cb, which is a high-impedance element, is connected to a drain of the MOS transistor Mn1 or Mp1. The overlight amount detection circuit 1 or 1a detects a potential fluctuation of the vertical signal line VSL based on a potential defined according to a threshold voltage Vth1, which is a gate potential of the MOS transistor Mn1 or Mp1, and outputs a potential of a contact point between the drain of the MOS transistor Mn1 or Mp1 and the high-impedance element as a signal indicating an overlight amount detection result. Thus, the overlight amount detection circuit 1 or 1a can detect an overlight amount of the image sensor 100 while ensuring a wide D range without increasing a circuit scale.

The high-impedance element is a capacitor Ca or Cb. Thus, the overlight amount detection circuit 1 or 1a can detect reception of light in an overlight amount by the image sensor 100 while ensuring a wide D range with a simple configuration.

The high-impedance element is a resistor. Thus, the overlight amount detection circuit 1 or 1a can detect reception of light in an overlight amount by the image sensor 100 while ensuring a wide D range with a simple configuration.

An imaging element of the image sensor 100 is an electron sensor converting incident light into electrons. The MOS transistor is an NMOS transistor Mn1. Thus, the overlight amount detection circuit 1 can detect reception of light in an overlight amount by the electron sensor.

An imaging element of the image sensor 100 is a hall sensor converting incident light into holes. The MOS transistor is a PMOS transistor Mp1. Thus, the overlight amount detection circuit 1a can detect reception of light in an overlight amount by the hall sensor.

The overlight amount detection circuit 1 or 1a outputs a signal indicating an overlight amount detection result to a counter 23 to which an output signal of a comparator 22, which compares a potential of the vertical signal line VSL with a Ramp wave that is a predetermined reference signal, is input. The counter 23 stops counting when a signal indicating that light has been received in the overlight amount is input thereto from the overlight amount detection circuit 1 or 1a. Thus, the image sensor 100 can prevent an occurrence of a sunspot.

The overlight amount detection circuit 1 or 1a outputs a signal indicating an overlight amount detection result to a comparator 22, which compares a potential of the vertical signal line VSL with a Ramp wave that is a predetermined reference signal. The comparator 22 stops comparing the potential of the vertical signal line VSL with the Ramp wave when a signal indicating that light has been received in the overlight amount is input thereto from the overlight amount detection circuit 1 or 1a. Thus, the image sensor 100 can prevent an occurrence of a sunspot.

The overlight amount detection circuit 1 or 1a outputs a dummy potential signal to the comparator instead of the potential of the vertical signal line VSL when light is received in the overlight amount. For example, when detecting the reception of light in the overlight amount, the overlight amount detection circuit 1 or 1a outputs a dummy potential signal, instead of the potential of the vertical signal line VSL, to a positive terminal of the comparator 22, the dummy potential signal corresponding to a case where light is received at a high brightness while not causing a charge e$^-$ generated by photoelectric conversion to exceed Qs. Thus, the image sensor 100 can prevent an occurrence of a sunspot.

Further, a light receiving element 110 includes an element substrate 30 and a readout circuit board 40. A photoelectric conversion unit of the image sensor is provided in the element substrate 30. The overlight amount detection circuit 1 or 1a is included in the readout circuit board 40. The overlight amount detection circuit 1 or 1a includes a MOS transistor Mn1 or Mp1 and a capacitor Ca or Cb, which is a high-impedance element. A source of the MOS transistor Mn1 or Mp1 is connected to a vertical signal line VSL of the image sensor. The capacitor Ca or Cb, which is a high-impedance element, is connected to a drain of the MOS transistor Mn1 or Mp1. Thus, the overlight amount detection circuit 1 or 1a can detect an overlight amount of the image sensor 100 while ensuring a wide D range without increasing a circuit scale.

Note that the effects described in the present specification are merely examples and are not limited, and there may be other effects as well.

Note that the present technology can also have the following configurations.

(1)
An overlight amount detection circuit including:
a metal oxide semiconductor (MOS) transistor of which a source is connected to a vertical signal line of an image sensor; and
a high-impedance element connected to a drain of the MOS transistor,
wherein a potential fluctuation of the vertical signal line is detected based on a potential defined by a gate potential of the MOS transistor, and a potential of a contact point between the drain of the MOS transistor and the high-impedance element is output as a signal indicating an overlight amount detection result.

(2)
The overlight amount detection circuit according to (1),
wherein the high-impedance element is a capacitor.

(3)
The overlight amount detection circuit according to (1),
wherein the high-impedance element is a resistor.

(4)
The overlight amount detection circuit according to any one of (1) to (3),
wherein an imaging element of the image sensor is an electron sensor that converts incident light into electrons, and
the MOS transistor is an N-channel MOS transistor.

(5)
The overlight amount detection circuit according to any one of (1) to (3),
wherein an imaging element of the image sensor is a hall sensor that converts incident light into holes, and
the MOS transistor is a P-channel MOS transistor.

(6)
The overlight amount detection circuit according to any one of (1) to (5),
wherein the signal indicating an overlight amount detection result is output to a counter to which an output signal of a comparator is input, the comparator comparing a potential of the vertical signal line with a predetermined reference signal.

(7)
The overlight amount detection circuit according to any one of (1) to (5),
wherein the signal indicating an overlight amount detection result is output to a comparator that compares a potential of the vertical signal line with a predetermined reference signal.

(8)
The overlight amount detection circuit according to (7),
wherein when it is detected that light is received in an overlight amount, a dummy potential signal is output to the comparator instead of the potential of the vertical signal line.

(9)
A light receiving element including:
an element substrate in which a photoelectric conversion unit is provided; and
a circuit board,
wherein the circuit board includes an overlight amount detection circuit, the overlight amount detection circuit including:
a metal oxide semiconductor (MOS) transistor of which a source is connected to a vertical signal line of the photoelectric conversion unit; and
a high-impedance element connected to a drain of the MOS transistor.

(10)
The light receiving element according to (9),
wherein the circuit board includes:
a transfer transistor of which a source is connected to the photoelectric conversion unit;
a reset transistor of which a source is connected to a drain of the transfer transistor; and
an amplification transistor of which a gate is connected to the drain of the transfer transistor.

(11)
The light receiving element according to (10), further including
a selection transistor of which a drain is connected to a source of the amplification transistor.

(12)
The light receiving element according to (11),
wherein the vertical signal line is connected to a source of the selection transistor.

(13)
The light receiving element according to (12),
wherein the source of the selection transistor is electrically connected to the source of the MOS transistor.
(14)
The light receiving element according to claim any one of (9) to (13), further including
a comparator connected to the overlight amount detecting circuit.
(15)
The light receiving element according to (14), further including
a counter connected to the comparator.
(16)
An electronic device including:
an optical system;
a photoelectric conversion unit that photoelectrically converts light incident through the optical system;
a signal processing circuit that signal-processes a signal charge into which the light is photoelectrically converted by the photoelectric conversion unit; and
an overlight amount detection circuit including a metal oxide semiconductor (MOS) transistor of which a source is connected to a vertical signal line of the photoelectric conversion unit, and a high-impedance element connected to a drain of the MOS transistor.

REFERENCE SIGNS LIST 1, 1a OVERLIGHT AMOUNT DETECTION CIRCUIT
100 IMAGE SENSOR
10 PIXEL UNIT
11 AD CONVERSION CIRCUIT
12 IMAGING UNIT
21 DAC
22 COMPARATOR
23 COUNTER
24 PLL
Mn1 NMOS TRANSISTOR
Mp1 PMOS TRANSISTOR
Ca, Cb CAPACITOR

The invention claimed is:
1. An overlight amount detection circuit comprising:
a metal oxide semiconductor (MOS) transistor of which a source is connected to a vertical signal line of an image sensor; and
a high-impedance element connected to a drain of the MOS transistor,
wherein a potential fluctuation of the vertical signal line is detected based on a potential defined by a gate potential of the MOS transistor, and a potential of a contact point between the drain of the MOS transistor and the high-impedance element is output as a signal indicating an overlight amount detection result,
an imaging element of the image sensor is a Hall sensor that converts incident light into holes, and
the MOS transistor is a P-channel MOS transistor.
2. The overlight amount detection circuit according to claim 1,
wherein the high-impedance element is a capacitor.
3. The overlight amount detection circuit according to claim 1,
wherein the high-impedance element is a resistor.
4. The overlight amount detection circuit according to claim 1,
wherein the signal indicating an overlight amount detection result is output to a counter to which an output signal of a comparator is input, the comparator comparing a potential of the vertical signal line with a predetermined reference signal.
5. The overlight amount detection circuit according to claim 1,
wherein the signal indicating an overlight amount detection result is output to a comparator that compares a potential of the vertical signal line with a predetermined reference signal.
6. The overlight amount detection circuit according to claim 5,
wherein when it is detected that light is received in an overlight amount, a dummy potential signal is output to the comparator instead of the potential of the vertical signal line.
7. A light receiving element comprising:
an element substrate in which a photoelectric conversion unit is provided; and
a circuit board,
wherein the circuit board includes an overlight amount detection circuit, the overlight amount detection circuit including:
a metal oxide semiconductor (MOS) transistor of which a source is connected to a vertical signal line of the photoelectric conversion unit; and
a high-impedance element connected to a drain of the MOS transistor,
the photoelectric conversion unit includes a Hall sensor that converts incident light into holes, and
the MOS transistor is a P-channel MOS transistor.
8. The light receiving element according to claim 7,
wherein the circuit board includes:
a transfer transistor of which a source is connected to the photoelectric conversion unit;
a reset transistor of which a source is connected to a drain of the transfer transistor; and
an amplification transistor of which a gate is connected to the drain of the transfer transistor.
9. The light receiving element according to claim 8, further comprising
a selection transistor of which a drain is connected to a source of the amplification transistor.
10. The light receiving element according to claim 9,
wherein the vertical signal line is connected to a source of the selection transistor.
11. The light receiving element according to claim 10,
wherein the source of the selection transistor is electrically connected to the source of the MOS transistor.
12. The light receiving element according to claim 7, further comprising
a comparator connected to the overlight amount detecting circuit.
13. The light receiving element according to claim 12, further comprising
a counter connected to the comparator.
14. An electronic device comprising:
an optical system;
a photoelectric conversion unit that photoelectrically converts light incident through the optical system;
a signal processing circuit that signal-processes a signal charge into which the light is photoelectrically converted by the photoelectric conversion unit; and
an overlight amount detection circuit including a metal oxide semiconductor (MOS) transistor of which a source is connected to a vertical signal line of the photoelectric conversion unit, and a high-impedance element connected to a drain of the MOS transistor, the photoelectric conversion unit includes a Hall sensor that converts incident light into holes, and the MOS transistor is a P-channel MOS transistor.

15. An overlight amount detection circuit comprising:

a metal oxide semiconductor (MOS) transistor of which a source is connected to a vertical signal line of an image sensor; and a high-impedance element connected to a drain of the MOS transistor, wherein a potential fluctuation of the vertical signal line is detected based on a potential defined by a gate potential of the MOS transistor, and a potential of a contact point between the drain of the MOS transistor and the high-impedance element is output as a signal indicating an overlight amount detection result, and the signal indicating an overlight amount detection result is output to a comparator that compares a potential of the vertical signal line with a predetermined reference signal.

* * * * *